(12) United States Patent
Yagi et al.

(10) Patent No.: US 6,634,776 B2
(45) Date of Patent: Oct. 21, 2003

(54) INFRARED IRRADIATION LAMP FOR AUTOMOBILE

(75) Inventors: Seiichiro Yagi, Shizuoka (JP); Takashi Inoue, Shizuoka (JP); Takashi Hori, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/127,499

(22) Filed: Apr. 23, 2002

(65) Prior Publication Data

US 2002/0154514 A1 Oct. 24, 2002

(30) Foreign Application Priority Data

Apr. 24, 2001 (JP) ........................................ 2001-126520
Apr. 24, 2001 (JP) ........................................ 2001-126530

(51) Int. Cl.[7] ................................................ B60Q 1/04
(52) U.S. Cl. ..................... 362/510; 362/294; 362/293; 362/516; 362/539; 362/464; 362/465; 362/466
(58) Field of Search ................................ 362/510, 294, 362/293, 516, 539, 464, 465, 466; 250/330

(56) References Cited

U.S. PATENT DOCUMENTS

2002/0080618 A1 * 6/2002 Kobayashi et al. ......... 362/466
2002/0154513 A1 * 10/2002 Yagi et al. .................. 362/510

FOREIGN PATENT DOCUMENTS

JP         2001-229717       8/2001

* cited by examiner

Primary Examiner—Sandra O'Shea
Assistant Examiner—Mark Tsidulko
(74) Attorney, Agent, or Firm—Sughrue Mion, PLLC

(57) ABSTRACT

An infrared irradiation lamp having a lamp housing S formed by a Lamp body 12 and a front lens 14, a reflector 16 provided in the lamp body 12, a bulb 20 inserted and attached into a bulb insertion attachment hole 13 of the reflector 16 and provided ahead of the reflector 16, and a cylindrical globe 30 for infrared light formation which is provided to cover the bulb 20 and serves to shield a visible light and to transmit only an infrared light, wherein a metallic bulb holder 60 having a radiation fin 68 extended to the back of the reflector 16 is provided between the bulb insertion attachment hole 13 and a mouth piece 21 of the bulb 20. Heat generated by turning on the bulb 20 is transferred to the bulb holder 60 and is radiated from the radiation fin 68 provided on the back of the reflector 16 to a space provided on the back of the reflector 16 so that the inside of the globe 30 is not filled with the heat. Thus, it is possible to avoid various problems caused by an increase in the temperatures of the bulb 20 and the globe 30 for infrared light formation.

15 Claims, 19 Drawing Sheets

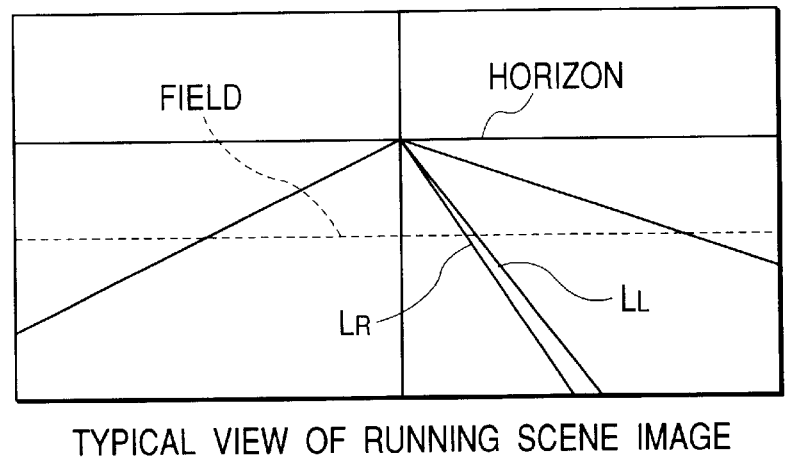
FIG. 2(a)
TYPICAL VIEW OF RUNNING SCENE IMAGE
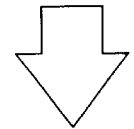
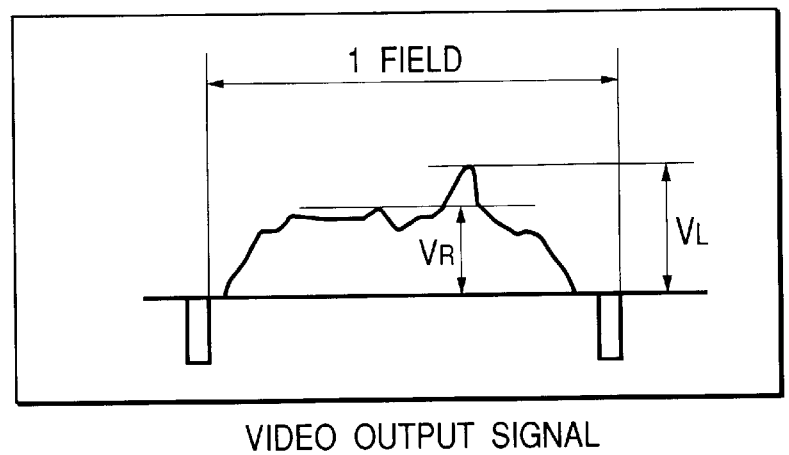
FIG. 2(b)
VIDEO OUTPUT SIGNAL

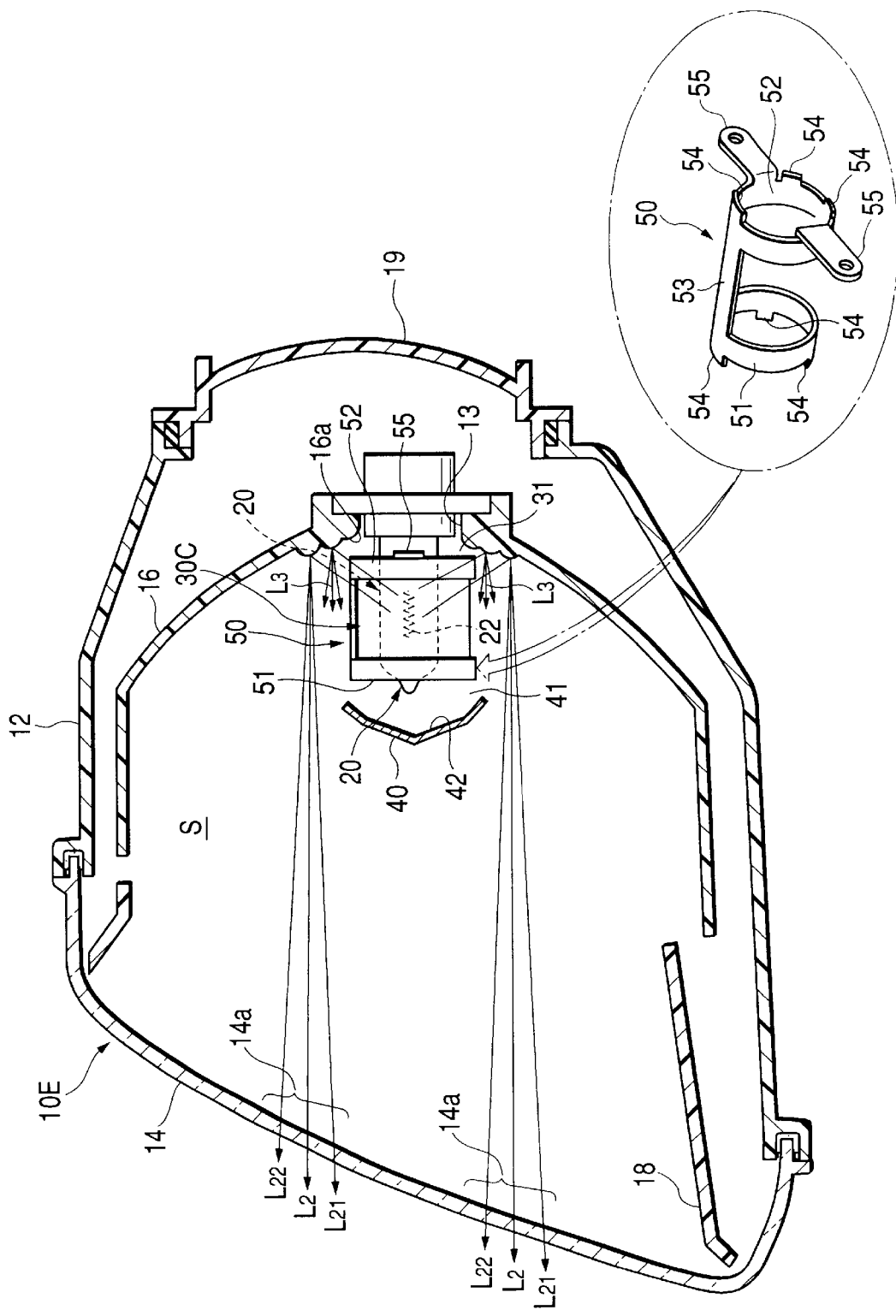

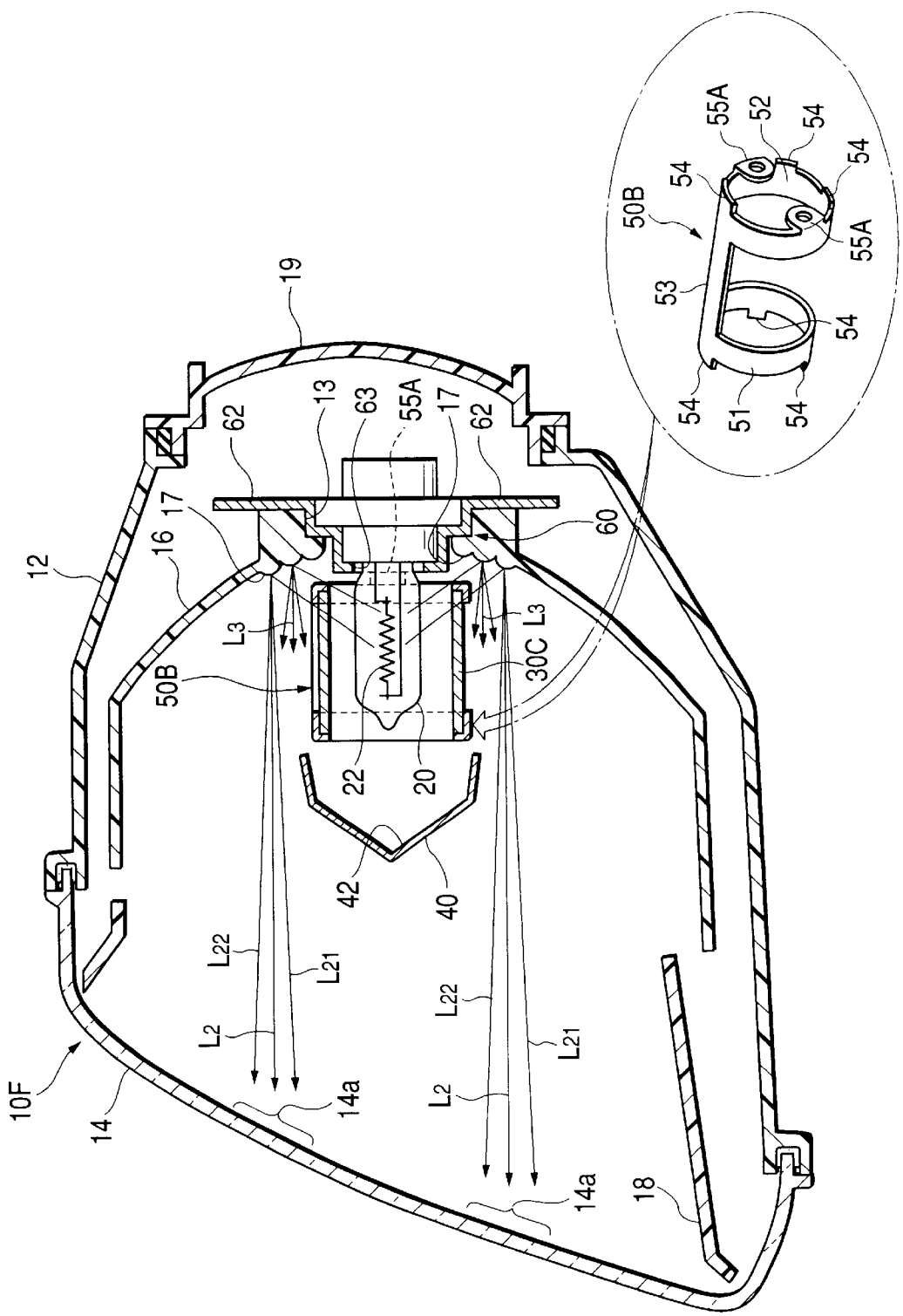

INFRARED IRRADIATION LAMP FOR AUTOMOBILE

BACKGROUND OF THE INVENTION

1. Field of the Invention

The present invention relates to an infrared irradiation lamp for an automobile which is mounted on an automobile and illuminates a forward portion of a vehicle with an infrared light, and more particularly to an infrared irradiation lamp for an automobile which has such a structure that an infrared light is formed by a globe for infrared light formation covering a bulb to be a light source and which is shared with a CCD camera having a sensitivity up to a near-infrared.

2. Description of the Related Art

For example, this kind of lamp has such a structure that a visible light source and a reflector are provided in a lamp housing formed by a lamp body and a front lens, an infrared light transmission globe having a surface coated with an infrared light transmission multilayer film is provided to cover the visible light source, and an infrared light in a light of a light source which is transmitted through a globe is reflected by the reflector, is transmitted through the front lens and is distributed forward.

An infrared light irradiation region in a forward portion of a vehicle is photographed by a CCD camera having a sensitivity up to a near-infrared which is provided in a front part of an automobile, is processed by an image processing apparatus and is projected onto a monitor screen in a vehicle compartment. A driver can confirm a person, a lane mark and an obstacle over the monitor screen projecting a field of view in the forward part of the vehicle at a great distance.

In the conventional infrared irradiation lamp, however, a halogen bulb to be a visible light source is surrounded by the infrared light transmission globe. Therefore, the inside of the globe is filled with heat generated from the bulb so that the inside of the globe has a high temperature. For this reason, there is a problem in that the halogen cycle of the halogen bulb does not function so that the lifetime of the bulb or the infrared light transmission globe is shortened, for example, blacking is generated to decrease an amount of a light or the infrared light transmission multilayer film of the globe is deteriorated to degrade an infrared ray cut characteristic.

Further, an infrared light transmission multilayer film cannot completely cut a visible light on the long-wavelength side of approximately 700 to 800 nm. Therefore, the lamp is seen to be turned on. For this reason, there is a possibility that the infrared irradiation lamp provided in the front part of an automobile might be erroneously recognized as a tail lamp or a stop lamp. Therefore, there is a problem in respect of safety.

Secondly, a halogen cycle does not function in a halogen bulb to be a visible light source. Consequently, there is a problem in that the lifetime of a light source or an infrared light transmission globe is shortened, for example, blacking is generated to decrease the amount of a light or the infrared light transmission multilayer film might be deteriorated to degrade an infrared ray cut characteristic.

The inventor made investigations for these causes. As a result, referring to the first problem, the red light component of the visible light which cannot completely be cut by the infrared light transmission globe (the visible light transmitted through the infrared light transmission globe) is guided to the whole reflector and a light reflected in a peripheral region of a light source in the reflector and emitted from the vicinity of the central part of a front lens has the highest energy (luminous flux density). Therefore, it has been confirmed that the vicinity of the central part of the front lens (the peripheral region of the light source in the reflector) is seen to emit a red light to be ring-shaped.

Referring to the second problem, moreover, the conventional infrared light transmission globe has a rear end thereof provided to abut on the reflector. Therefore, it has been confirmed that the inside of the infrared light transmission globe is filled with heat generated from a halogen bulb to be a visible light source, for example, and the lifetime of the light source or the infrared light transmission globe is thereby reduced, that is, blocking is generated to decrease the amount of the light and the infrared light transmission multilayer film is thermally degraded.

Therefore, the inventor supposed that the red light component of the visible light to be the cause of the lamp to be seen red is preferably diluted. Consequently, a clearance is provided between the rear end of the infrared light transmission globe and the reflector to directly guide a part of the light of the light source from the clearance to the peripheral region of the light source in the reflector. Thus, it has been confirmed that an advantage can be obtained in order to reduce a tone of red color for light emission of the lamp, and furthermore, the inside of the infrared light transmission globe is not filled with heat. Thus, the invention has been proposed.

The invention has been made based on the problems of the prior art and the knowledge of the inventor and has an object to provide an infrared irradiation lamp in which a clearance is provided between an infrared light transmission globe and a reflector so that the turn-on of a lamp is not erroneously recognized as a tail lamp or a stop lamp, and furthermore, the inside of the infrared light transmission globe is not filled with heat.

SUMMARY OF THE INVENTION

The invention has been made in consideration of the problems in the prior art and has an object to provide an infrared irradiation lamp in which the inside of a globe for infrared light formation is not filled with heat.

In order to achieve the object, a first aspect of the invention is directed to an infrared irradiation lamp for an automobile comprising a lamp housing formed by a lamp body and a front lens, a reflector provided in the lamp body, a light source provided ahead of the reflector in the lamp housing, and a cylindrical globe for infrared light formation which is provided to cover the light source and serves to shield a visible light and to transmit only an infrared light, wherein the globe for infrared light formation has a rear end thereof provided apart from the reflector, and a light of the light source is directly guided from a clearance provided between the reflector and the rear end of the globe for infrared light formation to a peripheral region of the light source in the reflector.

The light distribution of the lamp includes the case in which a step for light distribution control is not provided on the front lens but the light is controlled and formed by only the reflector in addition to the case in which the light reflected by the reflector is controlled and formed at the step for light distribution control provided on the front lens. It is assumed that the front lens also includes the front lens having no step for light distribution control, that is, a so-called front cover. (Function)

The red light component of the visible light which cannot be completely cut by the globe for infrared light formation (the visible light transmitted through the globe for infrared light formation) is reflected by the whole reflector and is emitted from the front lens. A light reflected by the peripheral region of the light source in the reflector and emitted from the vicinity of the central part of the front lens corresponding to the peripheral region of the light source has the highest energy (luminous flux density). For this reason, conventionally, the vicinity of the central part of the front lens (the region corresponding to the peripheral region of the light source in the reflector) is seen to emit a light like a red ring. In the first aspect of the invention, a part of the light of the light source (the light of the light source which is not transmitted through the globe for infrared light formation) is directly guided from the clearance provided between the reflector and the rear end of the globe for infrared light formation toward the inside of the peripheral region of the light source in the reflector, and the light of the light source (white light) thus reflected is also emitted from the vicinity of the central part of the front lens corresponding to the peripheral region of the light source. Consequently, the luminous flux intensity of the red light component distributed forward from the vicinity of the central part of the front lens is reduced and the red light emitted from the lamp is diluted.

Moreover, an air convection is generated across the inside and outside of the globe for infrared light formation through the clearance provided between the reflector and the rear end of the globe for infrared light formation. Thus, the heat in the globe is radiated out of the globe.

A second aspect of the invention is directed to the infrared irradiation lamp according to the first aspect of the invention, wherein a shielding shade for shielding the light of the light source emitted from an opening on a front end side of the globe is provided ahead of the globe for infrared light formation, and a clearance is provided between the shielding shade and the globe for infrared light formation. (Function)

The shielding shade provided ahead of the globe for infrared light formation shields the light of the light source emitted forward from the opening on the front end side of the globe, thereby blocking the generation of a glare light.

Moreover, the clearance is provided between the rear end of the globe for infrared light formation and the reflector, and furthermore, the clearance is provided between the shielding shade and the front end of the globe for infrared light formation (the front and rear ends of the globe are opened). Consequently, an air convection is easily generated across the inside and outside of the globe for infrared light formation. In addition, the air convection in the globe becomes active.

A third aspect of the invention is directed to the infrared irradiation lamp according to the first or second aspect of the invention, wherein an outer periphery of the rear end of the globe for infrared light formation is provided with an annular light shielding portion to be a part of a metallic holder for fixing and holding the globe for infrared light formation into the reflector or the shielding shade. (Function)

A part of the red light component of the visible light transmitted through the globe for infrared light formation toward the peripheral region of the light source in the reflector is shielded by the annular light shielding portion provided in the globe for infrared light formation. Therefore, the total amount of the red light component guided to the peripheral region of the light source in the reflector is correspondingly decreased so that the red light component emitted from the region of the central part of the front lens is diluted still more.

Moreover, since the globe for infrared light formation is gripped by the annular light shielding portion to be a part of the metallic holder in a whole circumferential direction, the globe is fixed and held firmly without a looseness with respect to the reflector.

In order to achieve the object, a fourth aspect of the invention is directed to an infrared irradiation lamp for an automobile comprising a lamp housing formed by a lamp body and a front lens, a reflector provided in the lamp body, a bulb to be a light source inserted and attached into a bulb insertion attachment hole of the reflector and provided ahead of the reflector, and a cylindrical globe for infrared light formation which is provided to cover the bulb and serves to shield a visible light and to transmit only an infrared light, wherein a metallic bulb holding member having a radiation fin extended to a back of the reflector is provided between the bulb insertion attachment hole and a mouth piece of the bulb.

The light distribution of the lamp includes the case in which a step for light distribution control is not provided on the front lens but the light is controlled and formed by only the reflector in addition to the case in which the light reflected by the reflector is controlled and formed at the step for light distribution control which is provided on the front lens. It is assumed that the front lens also includes the front lens having no step for light distribution control, that is, a so-called front cover.

The heat generated by turning on the bulb is transferred to the metallic bulb holding member provided between the bulb insertion attachment hole and the mouth piece of the bulb and is radiated from the radiation fin extended to the back of the reflector into a space (for example, the lamp housing) provided on the back of the reflector so that the inside of the globe for infrared light formation is not filled with the heat.

A fifth aspect of the invention is directed to the infrared irradiation lamp according to the first aspect of the invention, wherein a front end of the bulb holding member is extended to such a position as to face the vicinity of a light emitting portion of the bulb.

The heat generated by turning on the bulb is immediately transferred to the front end of the bulb holding member extended to such a position as to face the vicinity of the light emitting portion of the bulb and is radiated from the radiation fin extended to the back of the reflector into the space (for example, the lamp housing) provided on the back of the reflector so that the inside of the globe for infrared light formation can be prevented from being filled with the heat still more.

In particular, the bulb holding member includes a cylindrical portion which almost comes in close contact with the mouth piece of the bulb and the bulb insertion attachment hole, and the radiation fin extended to be plate-shaped (for example, disc-shaped) almost orthogonally from the rear end of the cylindrical portion. Consequently, it is possible to maintain a high airtightness in the bulb insertion attachment hole and a great heat radiating property to the space provided on the back of the reflector.

A sixth aspect of the invention is directed to the infrared irradiation lamp according to the first or second aspect of the invention, wherein the globe for infrared light formation has a rear end thereof provided apart from the reflector.

An air convection is generated across the inside and outside of the globe for infrared light formation through a clearance provided between the reflector and the rear end of the globe for infrared light formation. Thus, the heat in the globe is radiated out of the globe.

A seventh aspect of the invention is directed to the infrared irradiation lamp according to any of the first to third aspects of the invention, wherein a metallic shielding shade for shielding a direct light of a bulb which is emitted from an opening on a front end side of the globe is provided ahead of the globe for infrared light formation, and a clearance is provided between the shielding shade and the globe for infrared light formation.

The shielding shade shields the direct light of the bulb which is emitted from the opening on the front end of the globe for infrared light formation, thereby blocking the generation of a glare light. The shielding shade is formed of metal and there is no possibility that a thermal degradation might be caused.

An air convection is generated across the inside and outside of the globe for infrared light formation through the clearance provided between the shielding shade and the front end of the globe for infrared light formation so that the heat in the globe is radiated out of the globe. In particular, in the case in which a clearance is provided between the reflector and the rear end of the globe for infrared light formation, an air convection is easily generated across the inside and outside of the globe for infrared light formation. In addition, the air convection in the globe becomes active so that the heat radiating function of the air convection is promoted.

A eighth aspect of the invention is directed to the infrared irradiation lamp according to any of the first to fourth aspects of the invention, wherein the globe for infrared light formation is fixed to the reflector through a metallic globe holder provided in contact with an extended portion on a front end side of the bulb holding member.

The heat generated by turning on the bulb is transferred to the bulb holding member through the metallic globe holder for holding the globe for infrared light formation and is radiated from the radiation fin extended to the back of the reflector into the space (for example, the lamp housing) provided on the back of the reflector so that the inside of the globe for infrared light formation can be prevented from being filled with the heat still more.

Moreover, if (the leg of) the shielding shade and (the leg of) the globe holder are fastened and fixed together to the reflector with a screw, the heat of the shielding shade is also transferred to the bulb holding member through the globe holder and is thereby radiated from the radiation fin to the space provided on the back of the reflector. With such a structure that the globe holder comes in contact with the whole periphery of the cylindrical portion on the front end side of the bulb holding member, particularly, the globe for infrared light formation is fixed and held without a looseness with respect to the reflector, and furthermore, the area of a heat transfer path is increased so that heat radiating effects can be enhanced.

Furthermore, if the globe holder is constituted by a first globe holder for holding the globe and a second globe holder for backing up the first globe holder in engagement with (the cylindrical portion on the front end side of) the bulb holding member and a metallic elastic member such as a leaf spring or a coiled spring is provided between the globe holding the first globe holder and the second globe holder, the elastic member absorbs a vibration generated in the first globe holder (globe) and absorbs a thermal stress generated between the globe and the first globe holder.

BRIEF DESCRIPTION OF THE DRAWINGS

FIG. 2(a) is a typical diagram showing an image in a forward part of a vehicle, FIG. 2(b) is a diagram showing a picture output signal fetched in an image processing analyzer, FIG. 12 is a longitudinal sectional view showing an infrared irradiation lamp according to a seventh embodiment of the invention, FIG. 14 is a partially enlarged longitudinal sectional view showing an infrared irradiation lamp according to a eighth embodiment of the invention.

DESCRIPTION OF THE PREFERRED EMBODIMENTS

Next, embodiments of the invention will be described based on examples.

Figure 1:
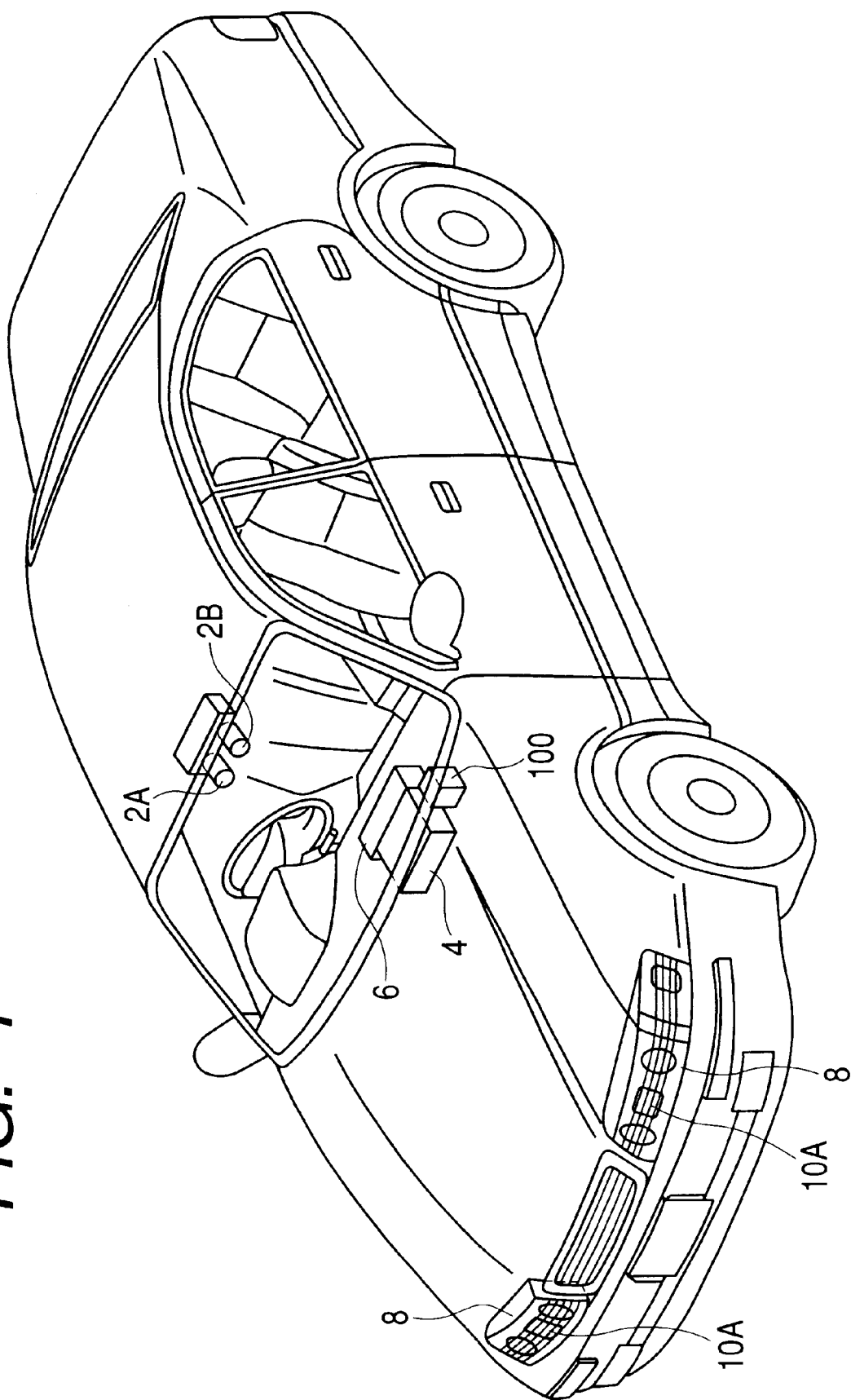
FIG. 1 is a view showing the whole structure of a night forward field-of-view detecting system using an infrared irradiation lamp according to a first embodiment of the invention.
Figure 3:
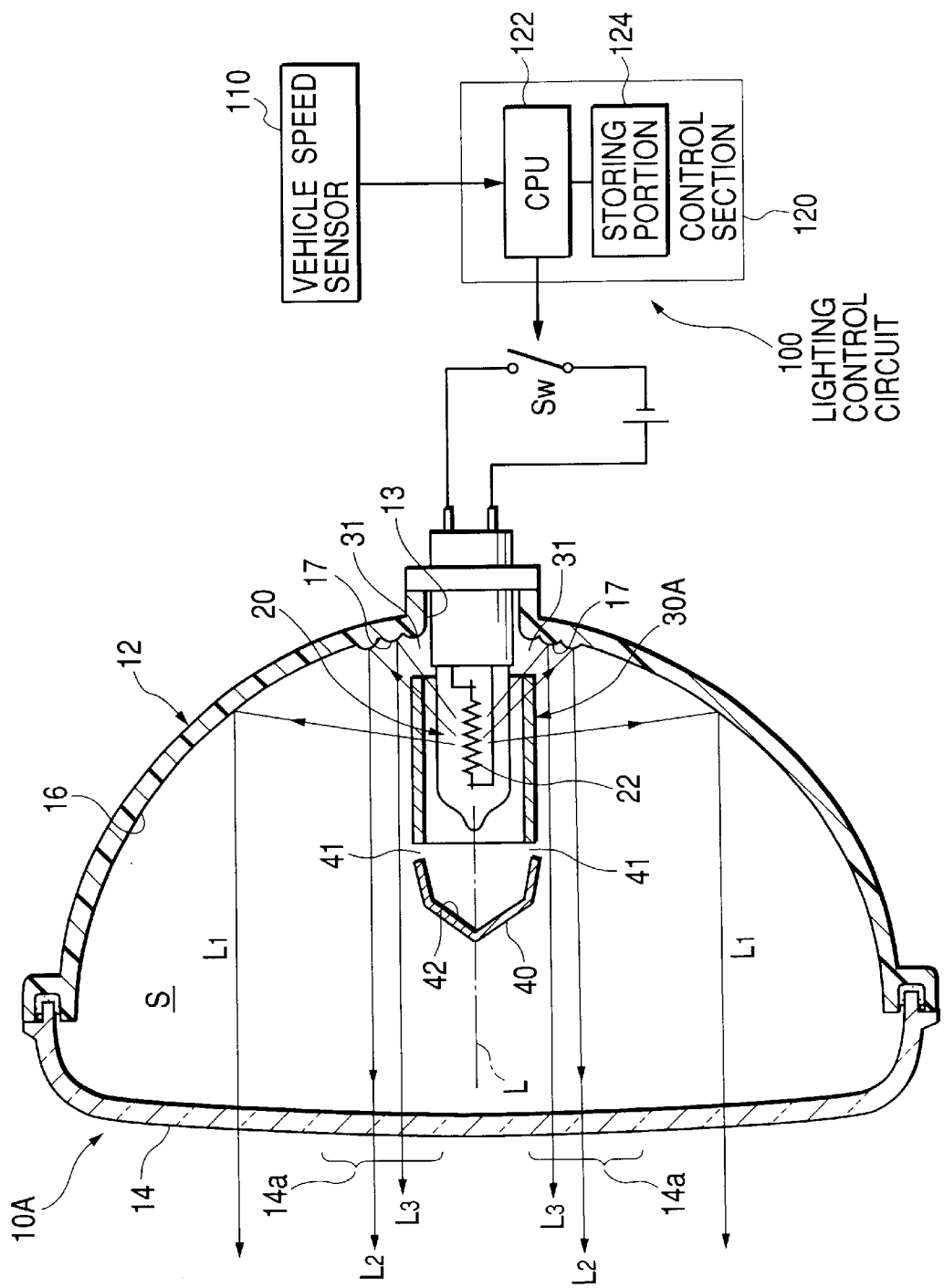
FIG. 3 is a longitudinal sectional view showing the infrared irradiation lamp according to the first embodiment of the invention.
Figure 4:
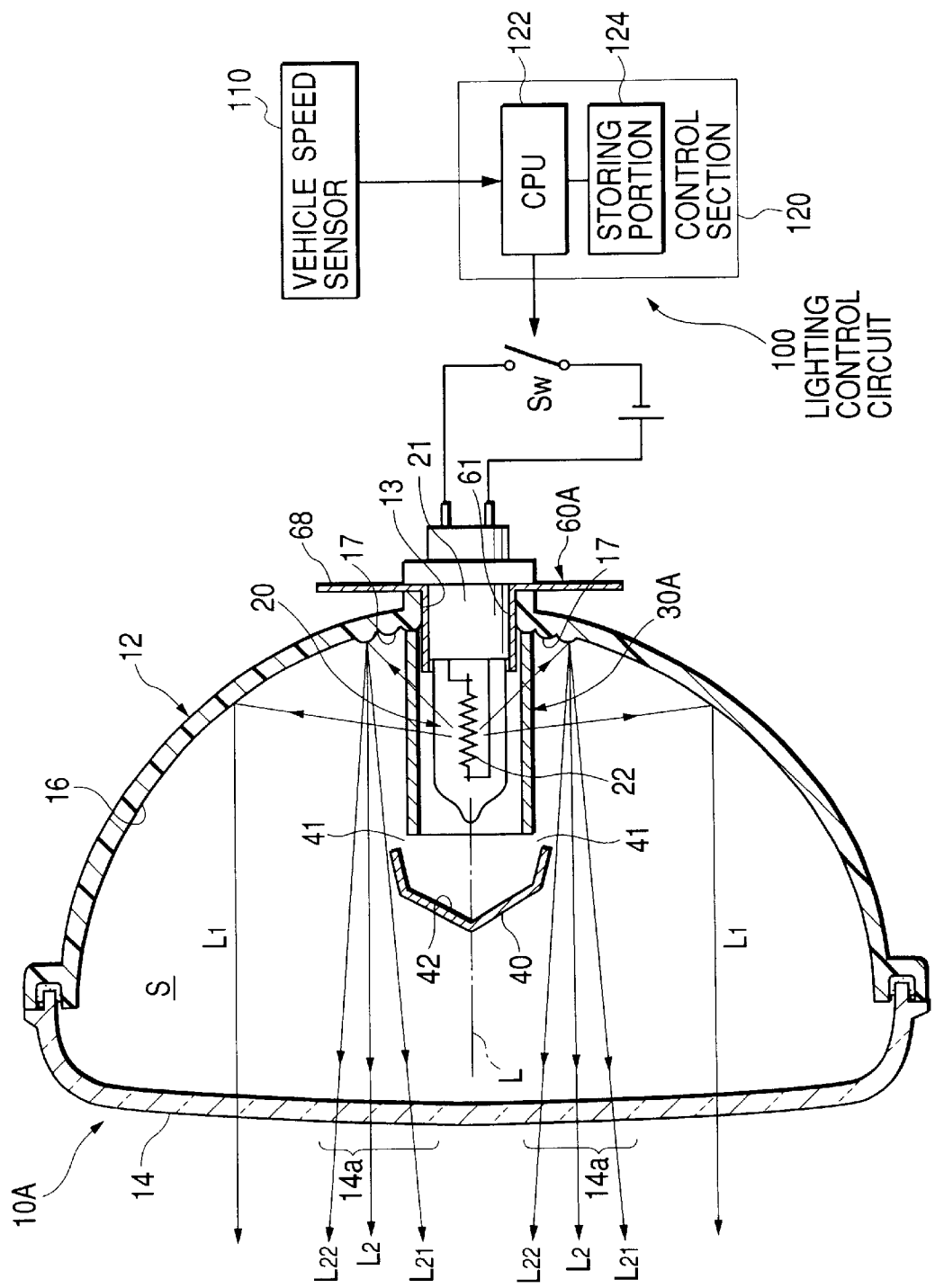
FIG. 4 is a longitudinal sectional view showing the infrared irradiation lamp according to the second embodiment of the invention.
Figures 5A, 5B:
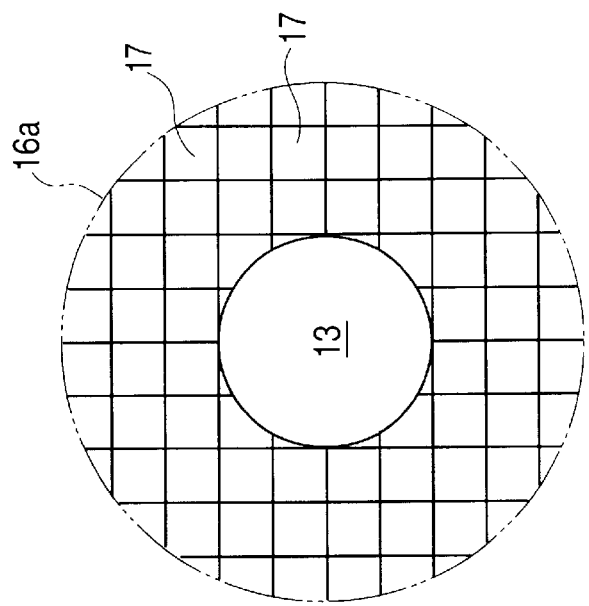
FIG. 5(a) is an enlarged longitudinal sectional view showing a peripheral region of a bulb to be the main part of the infrared irradiation lamp.
FIG. 5(b) is a front view showing a peripheral region of a bulb insertion attachment hole in a reflector.
Figure 6:
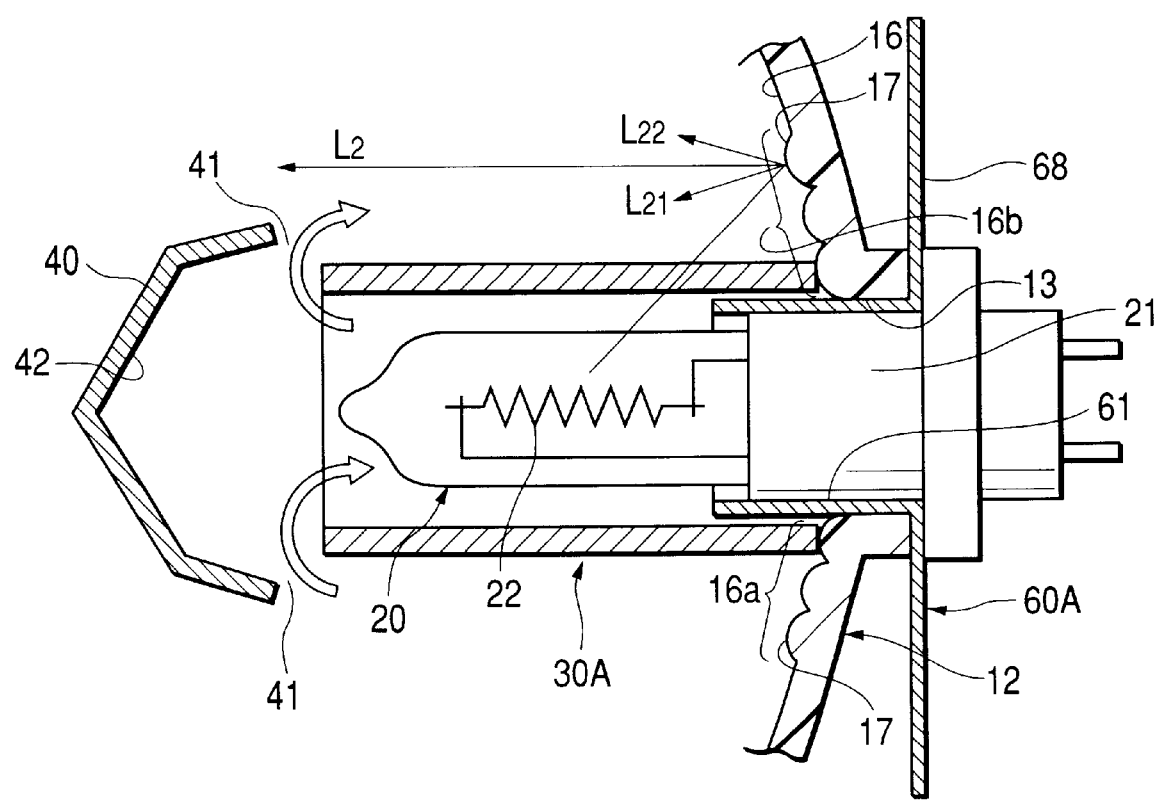
FIG. 6 is an enlarged longitudinal sectional view showing a peripheral region of a bulb to be the main part of the infrared irradiation lamp which is a modification of FIG. 5(a)
Figure 7:
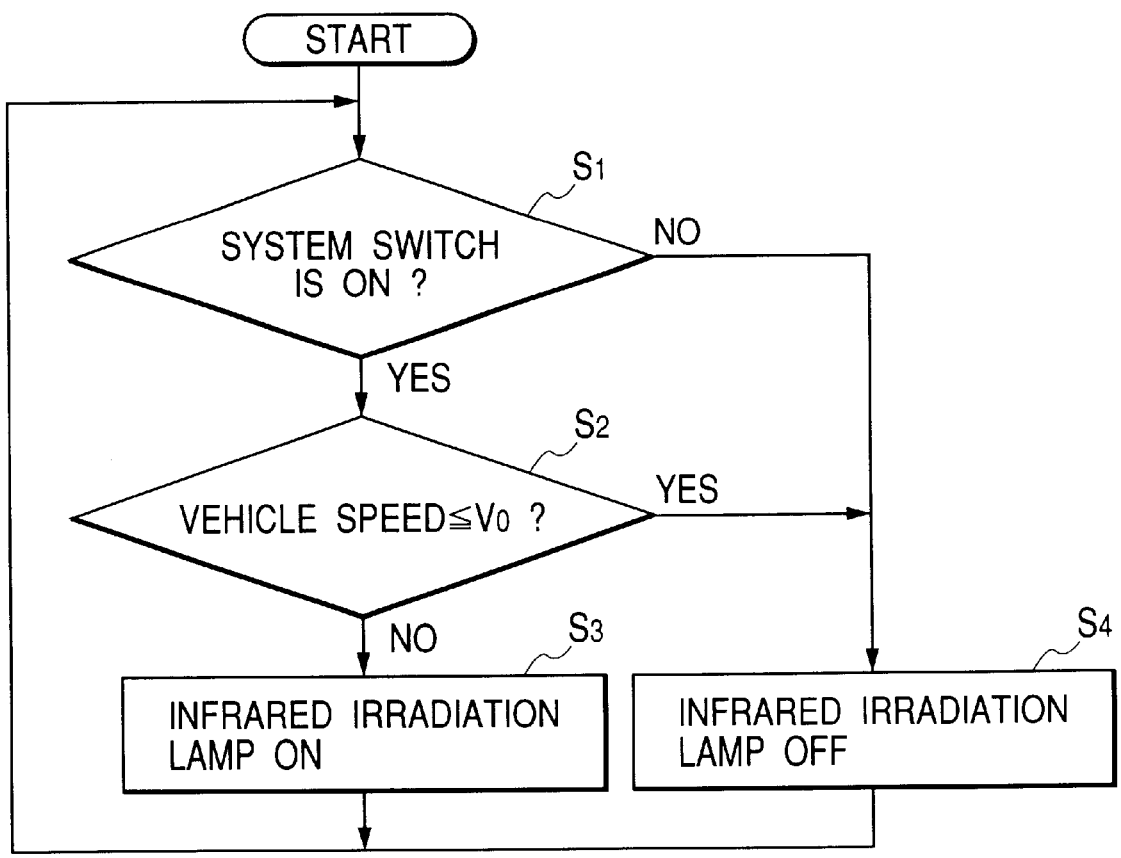
FIG. 7 is a flow chart showing a processing flow of a CPU in a control portion for controlling the turn-on of the infrared irradiation lamp.

FIGS. 1 to 7 show an example in which the invention is applied to a night forward field-of-view detecting system, and FIG. 1 is a view showing the whole structure of a night forward field-of-view detecting system using an infrared irradiation lamp according to a first embodiment of the invention, FIG. 2(a) is a typical diagram showing an image in a forward part of a vehicle which appears on a display, FIG. 2(b) is a diagram showing a picture output signal fetched in an image processing analyzer, FIG. 4 shows a longitudinal sectional view showing the infrared irradiation lamp, FIG. 5(a) is an enlarged longitudinal sectional view showing a peripheral region of a bulb to be the main part of the infrared irradiation lamp, FIG. 5(b) is a front view showing a peripheral region of a bulb insertion attachment hole in a reflector and FIG. 7 is a flow chart showing a processing flow of a CPU in a control portion for controlling the turn-on of the infrared irradiation lamp.

As shown in FIG. 1, the night forward field-of-view detecting system is mainly constituted by a headlamp 8 and an infrared irradiation lamp 10A which are provided in the front part of a vehicle, a pair of CCD cameras 2A and 2B provided side by side on the upper part in a vehicle compartment and serving to photograph a field of view in the forward portion of the vehicle, an image processing analyzer 4 for analyzing images photographed by the CCD cameras 2A and 2B, and a head up display (HUD) 6 for displaying data analyzed by the image processing analyzer 4.

The CCD camera for capturing the image of the forward region of the vehicle is constituted by the visible light CCD camera 2A having a sensitivity in a visible light area and the infrared light CCD camera 2B having a sensitivity up to an infrared light area, and is of a stereo camera type capable of measuring a distance to a forward view object. The images captured by both of the CCD cameras 2A and 2B are transferred to the image processing analyzer 4 and two pictures are compared with each other.

More specifically, a picture output voltage of each scanning line (field) is fetched from a picture (image) shown in FIG. 2(a) which is captured by the CCD camera and is stored as data on a whole screen (or a main part) in consideration of γ characteristics (photoelectric conversion characteristics) of both cameras 2A and 2B. The correction is required for adjusting the sensitivities of the cameras 2A and 2B to obtain almost the same picture outputs in the cameras 2A and 2B for an object on the road. By taking a difference between the two images and fetching the difference which is equal to or greater than a certain threshold from the pictures, it is possible to obtain pictures of a pedestrian, an obstacle and a lane mark at a great distance which cannot be seen. By carrying out an edge processing or pattern recognition based on the picture for the difference, it is possible to easily recognize the pedestrian, the obstacle and the lane mark.

The pictures of the pedestrian, the obstacle and the lane mark can be given to a driver through the head up display (HUD) 6 and the features of an object on the road (the pedestrian, the obstacle and the lane mark) can be decided by shape recognition and can be reported to the driver in a voice.

The CCD camera for capturing the image of the forward region of the vehicle may be constituted by one CCD camera having a sensitivity in a near-infrared light area and an infrared light area in place of the two CCD cameras including the visible light compatible CCD camera 2A and the infrared light compatible CCD camera 2B.

As shown in FIG. 4, moreover, the infrared irradiation lamp 10A is mainly constituted by a vessel-shaped lamp body 12, a front lens 14 assembled into the opening on the front surface of the lamp body 12 and forming a lamp housing S in cooperation with the lamp body 12, a parabolic reflector 16 formed integrally with the inner peripheral surface of the lamp body 12, a halogen bulb 20 to be a light source which is inserted and attached into a bulb insertion attachment hole 13 provided in the rear top portion of the reflector 16 (the lamp body 12), and a globe 30A for infrared light formation which is provided to surround the bulb 20.

FIG. 6 shows a modified construction of FIG. 5(a) so that a halogen bulb 20 is inserted through a bulb holder 60A and attached into a bulb insertion attachment hole 13.

The globe 30A for infrared light formation is provided cylindrically to entirely cover the bulb 20 and an infrared light transmission multilayer film for shielding a visible light and transmitting only an infrared light is provided in the whole area of the outer peripheral surface of a cylindrical globe body formed of glass. Accordingly, when the bulb 20 is turned on, lights L1 and L2 emitted from a filament 22 toward the reflector 16 are transmitted through the globe 30A, and the visible light is shielded by (the infrared light transmission multilayer film of) the globe 30A and only the infrared light can be transmitted through (the infrared light transmission multilayer film of) the globe 30A. Consequently, the infrared light guided to the reflector 16 is reflected as shown in the arrows L1 and L2 of FIG. 4, is transmitted through the front lens 14 and is distributed forward as a light which is almost parallel with an optical axis L of the lamp.

Moreover, a fish-eye step 17 to be a diffusion step is provided to surround the bulb insertion attachment hole 13 in a peripheral region 16a of the light source in the reflector 16 which is ring-shaped as seen from a front as shown in FIGS. 5(a) and 5(b), and a red light component transmitted through the globe 30A for infrared light formation and guided to the peripheral region 16a of the light source in the reflector 16 is diffused and reflected by the fish-eye step 17 as shown in an arrow of FIG. 6. The arrow L2 in FIG. 4 indicates the direction of the red light component diffused and reflected by the peripheral region 16a of the light source in the reflector 16 (the fish-eye step 17) and the diffusion and the reflection are carried out within a range from an arrow L21 to an arrow L22.

More specifically, the red light component of the visible light which cannot be completely cut by the globe 30A for infrared light formation (the visible light transmitted through the globe 30A for infrared light formation) is reflected by the whole reflector 16 and is emitted from the front lens 14. A light reflected by the peripheral region 16a of the light source in the reflector 16 and emitted from (a ring-shaped region seen from a front in) the vicinity 14a of the central part of the front lens 14 corresponding to the peripheral region 16a of the light source has the highest energy (luminous flux density). For this reason, conventionally, the vicinity 14a of the central part of the front lens 14 (the region corresponding to the peripheral region 16a of the light source in the reflector 16) emits a light as seen like a red ring. In the embodiment, a light L3 of the light source (the light of the light source which is not transmitted through the globe for infrared light formation) is directly guided from the clearance 31 provided between the reflector 16 and the rear end of the globe 30A for infrared light formation toward the inside of the peripheral region 16a of the light source in the reflector 16, and the light L3 (white light) of the light source thus reflected is also emitted from the vicinity 14a of the central part of the front lens 14 corresponding to the peripheral region 16a of the light source. Consequently, the luminous flux density of the red light component distributed forward from the vicinity 14a of the central part of the front lens 14 is reduced and the red light emitted from the lamp is diluted.

Moreover, a fish-eye step 17 to be a diffusion step is provided to surround the bulb insertion attachment hole 13 in the peripheral region 16a of the light source in the reflector 16 which is ring-shaped as seen from a front as shown in FIGS. 7(a) and 7(b). For this reason, the red light component L2 transmitted and guided through the globe 30A for infrared light formation and the light of the light source (the white light to be a visible light) L3 guided through the clearance 31 provided between the globe 30A and the reflector 16 are diffused and reflected respectively into a range shown in arrows L21 and L22 and L31 and L32 in the peripheral region 16a of the light source in the reflector 16 (the fish-eye step 17) as shown in FIG. 5(a) so that the luminous flux density of the red light component distributed forward from the vicinity 14a of the central part of the front lens 14 is further reduced and the red light emitted from the lamp is more diluted.

In the embodiment of FIG. 4 as a second embodiment of this invention, when the red light component of the visible light transmitted through the globe 30A for infrared light formation and guided to the peripheral region 16a of the light source in the reflector 16 is reflected by (the peripheral region 16a of the light source in) the reflector 16, it is diffused and reflected by the fish-eye step 17 as shown in the reference numerals L21 and L22 and is transmitted (emitted) as a diffused light through the front lens 14. For this reason, the luminous flux-density of the red light component distributed forward from the region 14a of the central part of the front lens 14 is decreased so that the degree of red light emission of the lamp is reduced. Thus, the red light component L2 (L21, L22) of the visible light distributed from the vicinity of the central part of the front lens 14 has a luminous flux density reduced as the diffused light. Therefore, the lamp is not seen to emit a red light.

Moreover, the bulb holder 60A is constituted by metal having a high thermal conductivity with such a structure that a disc-shaped radiation fin 68 is integrated with a cylindrical portion 61 which can be engaged with the bulb insertion attachment hole 13. The cylindrical portion 61 has such a size as to be engaged with a mouth piece 21 of the bulb 20, and the tip of the cylindrical portion 61 is extended to the vicinal position of the filament 22 to be the light emitting portion of the bulb 20 in such a configuration that the bulb holder 60A is engaged with the bulb insertion attachment hole 13. Therefore, heat generated by turning on the bulb 20 (filament 22) is transferred to the radiation fin 68 extended along the back face of the reflector 16 (the lamp body 10) from the cylindrical portion 61 of the bulb holder 60A extended into the globe 30A and is radiated from the radiation fin 68 to the atmosphere so that the inside of the globe 30A is not filled with the heat.

Moreover, a shielding shade 40 for shielding the light of the light source emitted forward through the opening on the front end of the globe 30A to block the generation of a glare light is provided ahead of the globe 30A. More specifically, the shielding shade 40 has the back side thereof subjected to a darkening process 42 in which a light can be absorbed easily and is formed to be slightly larger than the bore of the globe 30A, and the direct light (white light) of the bulb 20 can be prevented from breaking through the opening on the front end of the globe 30A as much as possible.

The shielding shade 40 is integrated with the reflector 16 with a leg thereof (not shown) fixed to the reflector 16. Moreover, the globe 30A is fixed around the bulb insertion attachment hole 13 of the reflector 16 and to the leg of the shielding shade 40 through a holder (not shown), for example.

Moreover, the clearance 31 is formed between the globe 30A for infrared light formation and the reflector 16 and a clearance 41 is formed between the globe 30A and the shielding shade 40 so that an air convection (see a white arrow in FIG. 5(a)) is generated across the inside and outside of the globe 30A through the clearances 31 and 41 and heat around the bulb 20 is transferred and radiated out of the globe 30A by the air convection. Accordingly, there is no possibility that the inside of the globe 30A might be filled with the heat and there are no problems that blacking is generated on the bulb 20 to reduce the amount of the light and the infrared light transmission multilayer film is deteriorated to degrade an infrared ray cut characteristic.

Moreover, there is a possibility that the infrared light might injure eyes of a person if it enters the eyes for a long period of time. By a lighting control circuit 100 (see FIG. 3) comprising a vehicle speed sensor 110 and a control portion 120 having a CPU 122 and a storage portion 124 in the lamp 10A, therefore, the bulb 20 is turned on during only a running operation in which the infrared light does not injure the eyes, and the bulb 20 is automatically put out at a predetermined speed V0 or less at which a vehicle speed V approximates to zero at time of stoppage in which the infrared light might injure the eyes.

More specifically, a vehicle speed condition for outputting a stop signal to stop the turn-on of the bulb 20 (lamp 10A) is previously input and set to the storage portion 124 of the control portion 120. When the CPU 122 decides that the vehicle speed V is set to be the predetermined speed V0 or less which approximates to zero in response to an output sent from the vehicle speed sensor 110, it outputs a stop signal for turning OFF a bulb turn-on switch Sw. Consequently, the bulb turn-on switch Sw is turned OFF so that the supply of a current to the bulb 20 is stopped and the bulb 20 (lamp 10A) is thereby put out.

Moreover, the shielding shade 40 is provided apart from the front end of the globe 30A, that is, a clearance 41 is provided between the shielding shade 40 and the front end of the globe 30A. An air convection is generated across the inside and outside of the globe 30A shown in a white arrow of FIG. 6 through the clearance 41 so that the heat in the globe 30A is radiated out of the globe 30A.

The shielding shade 40 is integrated with the reflector 16 with a leg thereof (not shown) fixed to the reflector 16. Moreover, the globe 30A is fixed around the bulb insertion attachment hole 13 of the reflector 16 through bonding or a globe holder (not shown).

FIG. 7 shows a processing flow of the control portion 120 (CPU 122) of the lighting control circuit 100. This routine is started on the premise that a headlamp 8 (a low beam or a main beam) is set in a turn-on state.

At a step S1, first of all, it is decided whether or not a switch for operating a night forward field-of-view detecting system is turned ON. In the case in which a driver drives while watching an image on the head up display 6, the system operating switch is pressed as a manual switch and may be turned ON interlockingly with the turn-on of the low beam of the headlamp.

If the decision is YES (the night forward field-of-view detecting system operating switch is ON) at the step S1, it is decided whether or not a vehicle speed V is equal to or smaller than a predetermined value (V0) which approximates to zero based on the output of the vehicle speed sensor 110. It the decision is NO (V>V0) at the step S2, the process proceeds to a step S3 in which an output is sent to turn on the bulb 20 (the infrared irradiation lamp 10A) and the process then returns to the step S1. On the other hand, if the decision is NO (the night forward field-of-view detecting system operating switch is not turned ON) at the step S1 or the decision is YES (V≦V0) at the step S2, an output is sent to put out the lighted bulb 20 (infrared irradiation lamp 10A) at a step S4 and the process then returns to the step S1.

Figure 8:
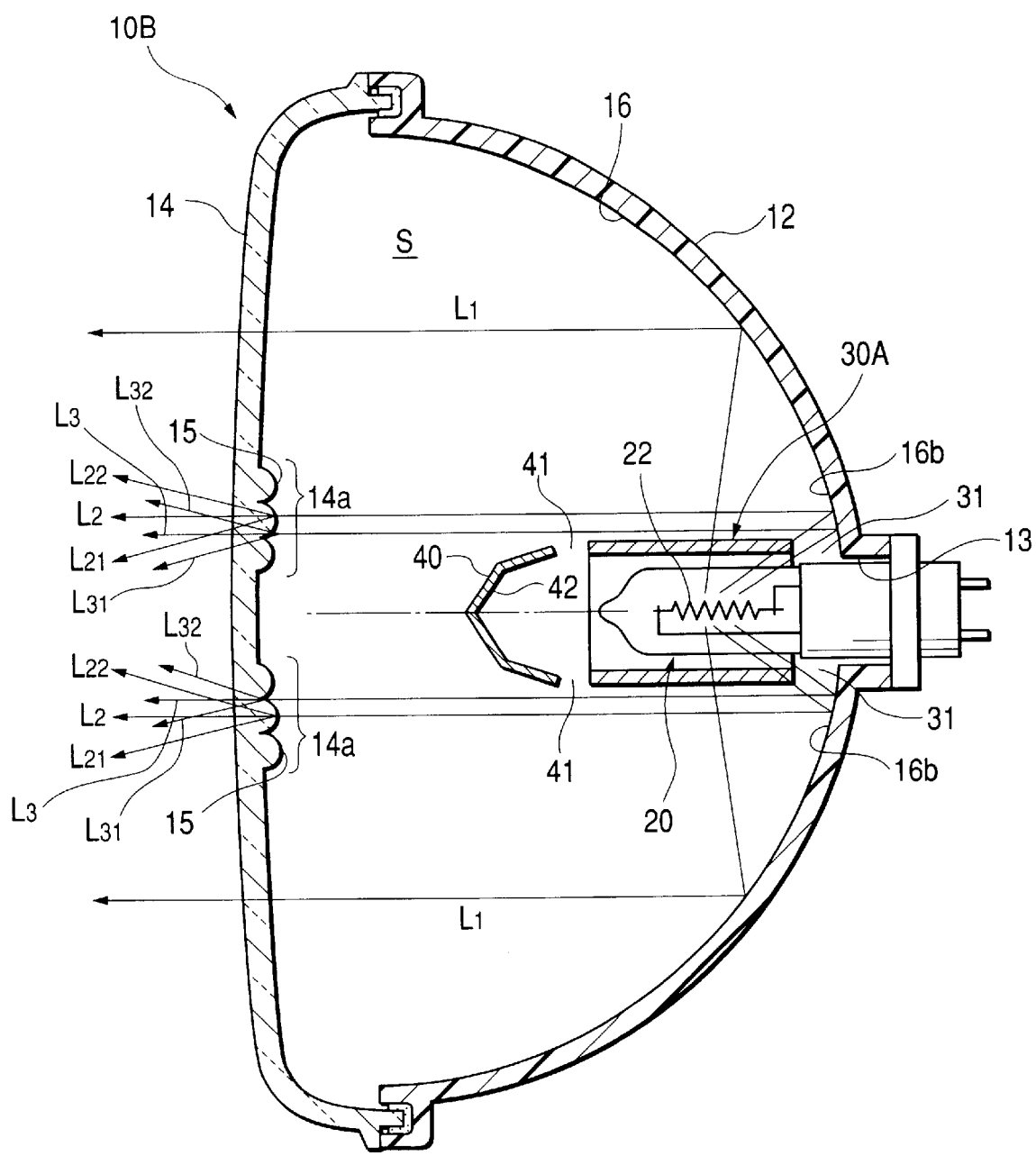
FIG. 8 is a longitudinal sectional view showing an infrared irradiation lamp according to a third embodiment of the invention.

A FIG. 8 is a longitudinal sectional view showing an infrared irradiation lamp according to a third embodiment of the invention.

While the red light component L2 and the visible light (white light) L3 are diffused by the fish-eye step 17 provided in the peripheral region 16a of the light source in the reflector 16 in the first embodiment, a fish-eye step 15 for diffusing the red light component L2 and the visible light (white light) L3 is provided in a ring-shaped region 14a of the central part of a front lens 14 corresponding to a peripheral region 16a of a light source in a reflector 16 in an infrared irradiation lamp 10B in the second embodiment.

More specifically, the red light component and the visible light (white light) which are reflected in a peripheral region 16b of the light source in the reflector 16 (a parabolic reflecting surface) as shown in the reference numerals L2 and L3 are diffused by the fish-eye step 15 as shown in arrows L21, L22, L31 and L32 during transmission (emission) through the front lens 14. Therefore, the luminous flux density of the red light component distributed forward from the front lens 14 is reduced so that the lamp is not seen to emit a red light.

Others are the same as those in the first embodiment and have the same reference numerals, and repetitive description thereof will be thereby omitted.

As described in the first embodiment, moreover, the fish-eye step 17 may be provided in the peripheral region 16a of the light source in the reflector 16 and the fish-eye step 15 may be provided in the ring-shaped region 14a of the front lens 14 corresponding to the peripheral region 16a of the light source in the reflector 16, which is not shown.

Thus, in the case in which the fish-eye steps 17 and 15 are provided in both of the reflector 16 and the front lens 14, the red light component L2 of a visible light which is not cut by a globe 30A for infrared light formation but is guided and the light L3 of a light source (a white light to be a visible light) guided through a clearance 31 are diffused by the diffusion step 17 when they are reflected by (the peripheral region 16a of the light source in) the reflector 16, and furthermore, are diffused by the diffusion step 15 when they are emitted from the front lens 14. More specifically, the red light component L2 and the white light L3 which are diffused and reflected by the peripheral region 16a of the reflector 16 are further diffused when they are transmitted (emitted) through the region 14a of the central part of the front lens 14. Therefore, the luminous flux density of the red light component distributed forward from the front lens 14 is reduced still more so that the lamp is not seen to emit a red light at all.

Figure 9:
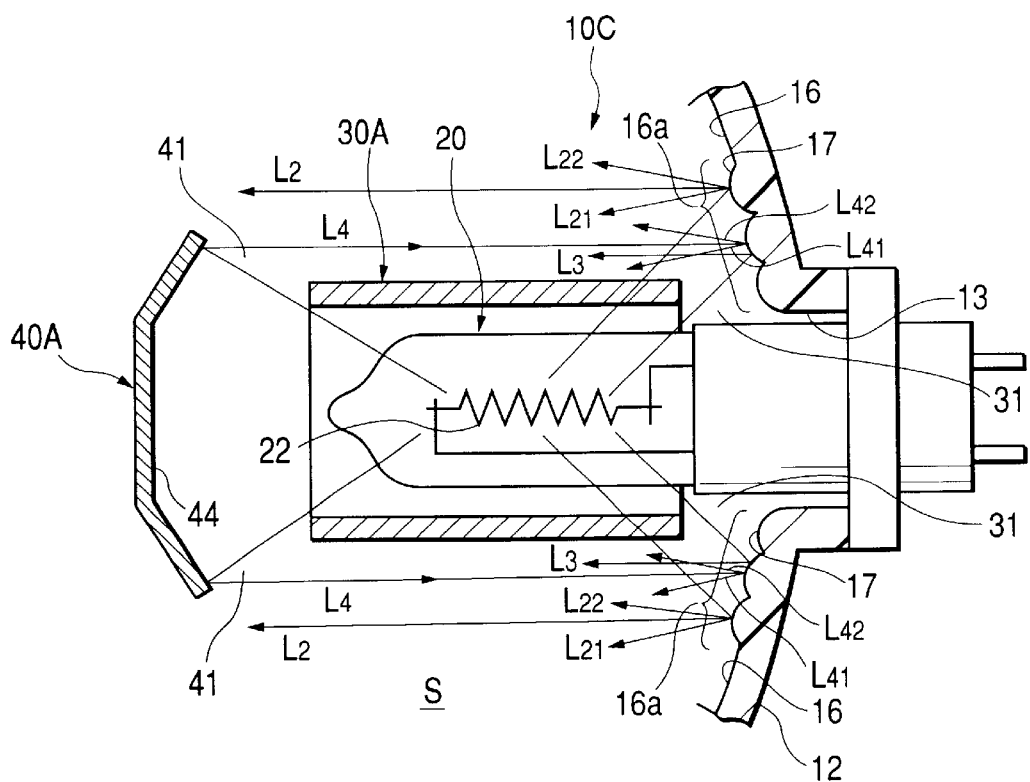
FIG. 9 is an enlarged longitudinal sectional view showing the peripheral region of a bulb to be the main part of an infrared irradiation lamp according to a fourth embodiment of the invention.

FIG. 9 is an enlarged longitudinal sectional view showing the peripheral region of a bulb to be the main part of an infrared irradiation lamp according to a fourth embodiment of the invention.

In an infrared irradiation lamp 10C according to the third embodiment, a light of a light source emitted from the opening of the front end of a globe 30A is reflected by a reflecting surface 44 and is guided to a peripheral region 16a of the light source in a reflector by using a shielding shade 40A having a back face subjected to the reflecting surface 44 processing in place of the shielding shade 40 used for the infrared irradiation lamp 10A according to the first embodiment. Others are the same as those in the first embodiment and have the same reference numerals, and repetitive description thereof will be thereby omitted.

In the third embodiment, the light of the light source (white light) is guided through the shade 40A as shown in an arrow L4 to the peripheral region 16a of the light source in the reflector for diffusing and reflecting an infrared light component L2 of a visible light transmitted through the globe 30A (see the reference numerals L21 and L22) and for diffusing and reflecting a light L3 of a light source (white light) guided through a clearance 31 (see the reference numerals L31 and L32 in FIG. 5(a)). Therefore, the diffused visible light components (white light components) L31, L32, L41 and L42 mixed with the diffused red light components L21 and L22 are emitted from a vicinity 14a of the central part of a front lens. Accordingly, the luminous flux density of the red light component distributed forward from the vicinity 14a of the central part of the front lens is reduced still more so that the lamp is not seen to emit a red light.

Figure 10:
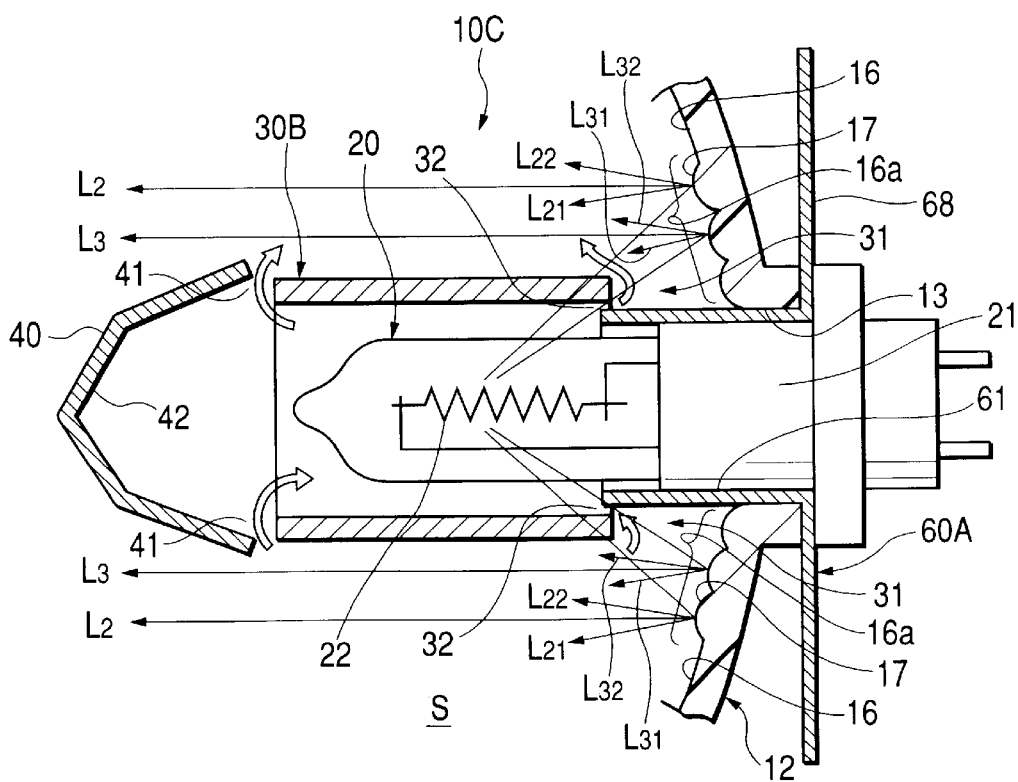
FIG. 10 is an enlarged longitudinal sectional view showing a peripheral region of a bulb to be the main part of an infrared irradiation lamp according to a fifth embodiment of the invention.

FIG. 10 is an enlarged longitudinal sectional view showing the peripheral region of a bulb to be the main part of an infrared irradiation lamp according to a fifth embodiment of the invention.

An infrared irradiation lamp 10C according to the third embodiment is characterized in that the length of a globe 30B for infrared light formation is smaller than that of the globe 30A used in the infrared irradiation lamp 10A according to the first embodiment and the rear end of the globe 30B is provided apart from the reflector 16 so that the light of the light source is directly guided from a clearance 31 provided between the reflector 16 and the rear end of the globe 30B toward the inside of a peripheral region 16a of the light source in the reflector 16.

More specifically, while the red light component of the visible light transmitted through the globe 30B is diffused and reflected and is thus guided forward by a fish-eye step 17 of the peripheral region 16a of the light source in the reflector 16 as shown in the reference numeral L2 (L21, L22) in the embodiment, the light (white light) of the light source which is guided toward the inside of the peripheral region 16a of the light source in the reflector 16 and is not transmitted through the globe 30A is also diffused and reflected and is thus guided forward by the fish-eye step 17 as shown in the reference numeral L3 (L31, L32) so that both lights L2 and L3 are emitted from the vicinity of the central part of a front lens corresponding to the peripheral region 16a of the light source. For this reason, the luminous flux density of a red light component distributed forward from the vicinity of the central part of the front lens is more reduced than that in the case of the lamp 10A according to the first embodiment so that the lamp is not seen to emit a red light at all.

In the embodiment, moreover, a clearance 32 communicating with the clearance 31 is formed between the rear end of the globe 30B and the tip portion of a cylindrical portion 61 of a bulb holder 60A. Consequently, an air convection (see a white arrow in FIG. 10) is generated across the inside and outside of the globe 30B through a clearance 41 provided between the reflector 16 and a shielding shade 40 and the clearance 31 provided between the reflector 16 and the rear end of the globe 30B (a clearance 32 provided between the cylindrical portion 61 of the bulb holder 60A and the globe 30B) so that the heat of the globe 30B is efficiently radiated out of the globe 30B and the inside of the globe 30B is not thereby filled with the heat.

Others are the same as those in the first embodiment and have the same reference numerals, and repetitive description thereof will be thereby omitted.

Figure 11:
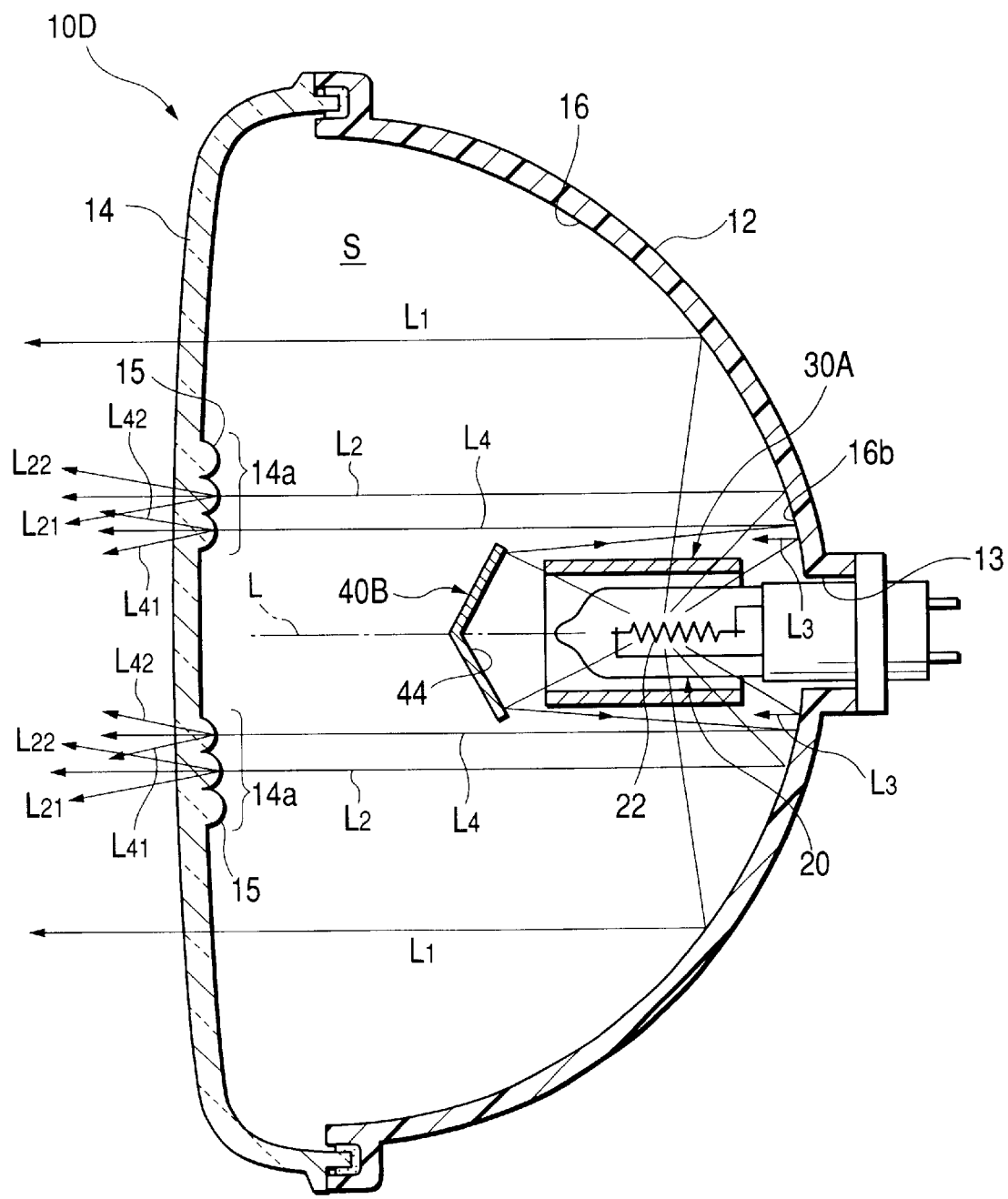
FIG. 11 is a longitudinal sectional view showing an infrared irradiation lamp according to a sixth embodiment of the invention.

FIG. 11 is an enlarged longitudinal sectional view showing an infrared irradiation lamp according to a sixth embodiment of the invention.

In an infrared irradiation lamp 10D according to the fourth embodiment, a light of a light source (a white light) emitted from the opening of the front end of a globe 30A is reflected by a reflecting surface 44 and is guided to a peripheral region 16b of the light source in a reflector by using a shade 40B having a back face subjected to the reflecting surface 44 processing in place of the shade 40 used for the infrared irradiation lamp 10B according to the second embodiment (see FIG. 8). Others are the same as those in the second embodiment and have the same reference numerals, and repetitive description thereof will be thereby omitted.

In the fourth embodiment, a light L4 of a light source (a white light) reflected by the shade 40B and reflected by the peripheral region (a parabolic reflecting surface) 16b of the light source in the reflector is also guided to a vicinity 14a of the central part of the front lens. Therefore, when a red light component L2 and white light components L3 and L4 are emitted from the vicinity 14a of the central part of the front lens, they are diffused respectively as shown in arrows L21, L22, L31, L32 (see FIG. 8), L41 and L42. Consequently, the luminous flux density of the red light component distributed forward from the vicinity 14a of the central part of the front lens is reduced still more so that the lamp is not seen to emit a red light.

Figure 13A:
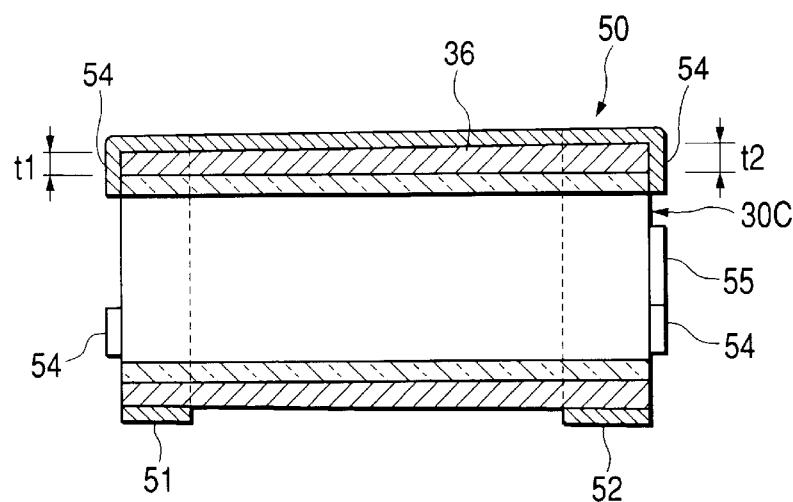
FIG. 13(a) is an enlarged longitudinal sectional view showing a globe for infrared light formation to be the main part of the same lamp.
Figure 13B:
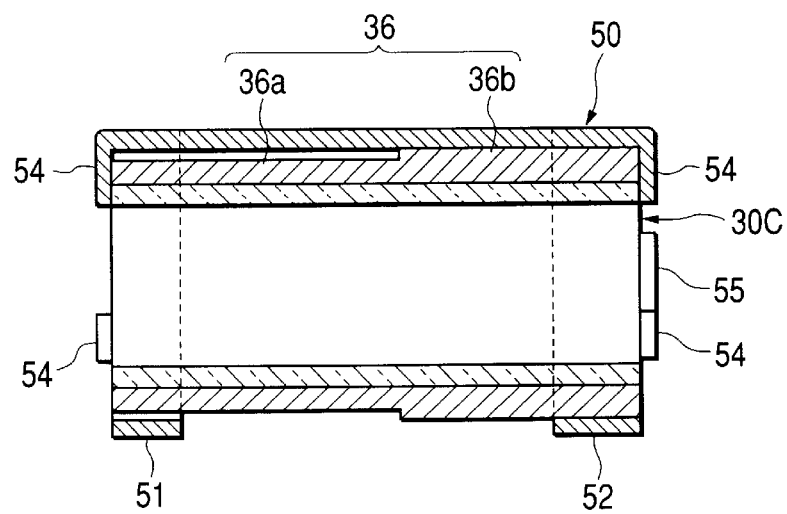
FIG. 13(b) is an enlarged longitudinal sectional view showing a variant of the globe for infrared light formation to be the main part of the same lamp.
Figure 13C:
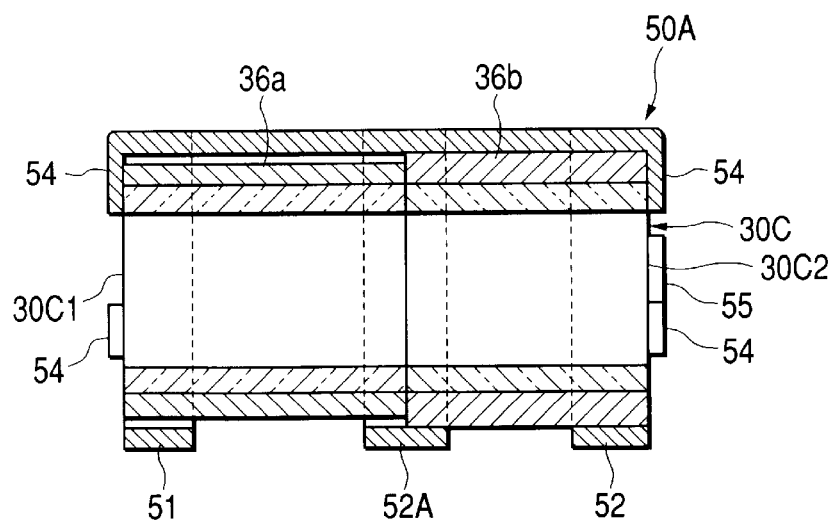
FIG. 13(c) is an enlarged longitudinal sectional view showing another variant of the globe for infrared light formation to be the main part of the same lamp.

FIGS. 12 and 13(a) to (c) show an infrared irradiation lamp according to a seventh embodiment of the invention, FIG. 12 being a longitudinal sectional view showing the infrared irradiation lamp and FIGS. 13(a) to 13(c) being enlarged longitudinal sectional views showing a globe for infrared light formation to be the main part of the same lamp, respectively.

While the reflector 16 is formed integrally with the inner peripheral surface of the lamp body 12 in all the infrared irradiation lamps 10A to 10D according to the first to fourth embodiments, the reflector 16 is supported tiltably with respect to the lamp body 12 by means of an aiming mechanism (not shown) in an infrared irradiation lamp 10E according to this embodiment.

A globe 30C for infrared light formation which covers a halogen bulb 20 is held by a metallic holder 50 fixed to the reflector 16. The holder 50 has such a structure that annular portions 51 and 52 capable of holding the front and rear ends of the globe 30C are integrated by a longitudinally extended straight portion 53, and a click 54 is provided in three equal circumferential parts of the annular portions 51 and 52, respectively. The globe 30C is inserted in the annular portions 51 and 52 to caulk the click 54 so that the globe 30C and the holder 50 are integrated with each other. The annular portion 52 is provided with a pair of left and right legs 55 extended orthogonally and the leg 55 is fixed to the reflector 16 with a screw so that the globe 30C is integrated with the reflector 16. The globe 30C is held wholly in a circumferential direction by the annular portion 52 to be a part of the metallic holder 50. Therefore, the globe 30C is firmly fixed and held without a looseness with respect to the reflector 16.

An infrared light transmission multilayer film 36 formed in the globe 30C is provided such that a thickness is gradually changed (t1<t2) in the longitudinal direction of the globe 30C (the thickness is increased toward the base of the bulb 20) as shown in FIG. 13(a), and a visible light cut ratio is gradually changed in the longitudinal direction (the visible light cut ratio is increased if the thickness of the infrared light transmission multilayer film 36 is increased). In the light transmitted through the globe 30C (the infrared light transmission multilayer film 36) toward a peripheral region 16a of a light source in the reflector 16, therefore, a visible light is cut in a large amount and the rate of an infrared light is high (the rate of an infrared light component in the visible light is small), and the light having a small rate of the infrared light component in the visible light is diffused and reflected by (a fish-eye step 17 of) the peripheral region 16a of the light source in the reflector 16 as shown in an arrow L2 (L21, L22) and is thus emitted from a region 14a of the central part of a front lens.

Moreover, a clearance 31 is formed between the rear end of the globe 30C and the reflector 16, and a part of a light of the light source (a white light) is guided from the clearance 31 to the peripheral region 16a of the light source in the reflector 16 and is then diffused and reflected by the fish-eye step 17 (see an arrow L3). For this reason, the luminous flux density of the infrared light component L2 (L21, L22) distributed forward from the region 14a of the central part of the front lens is very reduced.

Furthermore, the red light component of the visible light transmitted through the globe 30C toward the peripheral region 16a of the light source in the reflector is shielded by the annular portion 52 surrounding the rear end of the globe 30C. Therefore, the total amount of the red light component L2 guided to the peripheral region 16a of the light source in the reflector 16 is correspondingly decreased and the luminous flux density of the red light component L2 (L21, L22) distributed forward from the region 14a of the central part of the front lens is further reduced so that the lamp is not seen to emit a red light.

The reference numeral 18 denotes an extension reflector, and the reference numeral 19 denotes a cover attached to an opening for bulb exchange in the rear top portion of the lamp body 12. Others are the same as those in the first embodiment and have the same reference numerals, and repetitive description thereof will be thereby omitted.

Moreover, the globe 30C for infrared light formation may have structures shown in FIGS. 13(b) and 13(c). More specifically, in FIG. 13(b), the infrared light transmission multilayer film 36 formed in the globe 30C is integrally constituted by two kinds of portions 36a and 36b having different thicknesses in a longitudinal direction. In FIG. 13(c), a globe portion 30C1 provided with the thin infrared light transmission multilayer film 36a and a globe portion 30C2 provided with the thick infrared light transmission multilayer film 36b are integrated by a holder 50A provided with an annular portion 52A for holding the abutment portion of both globe portions 30C1 and 30C2, thereby constituting the globe 30C.

FIGS. 13(b) and 13(c) typically show different thicknesses in order to make a difference in a thickness between the infrared light transmission multilayer films 36a and 36b. An actual infrared light transmission multilayer film is formed by evaporation. Therefore, the difference in the thickness between the infrared light transmission multilayer films 36a and 36b is too small to be seen.

FIG. 14 is a longitudinal sectional view showing an infrared irradiation lamp according to a eighth embodiment of the invention.

An infrared irradiation lamp 10F according to the embodiment has a reflector 16 supported tiltably with respect to a lamp body 12 by means of an aiming mechanism (not shown) in the same manner as the lamp 10E according to the fifth embodiment. Moreover, a light L2 transmitted through a globe 30C and a light L3 of a light source (a white light) which are guided to a peripheral region 16a of a light source in the reflector 16 are diffused and reflected as shown in arrows L21, L22, L31 and L32 and are emitted from a region 14a of the central part of a front lens.

Furthermore, a second metallic holder 60 comprising a radiation fin 62 extended to the back of the reflector 16 is fixed integrally with a metallic holder 50B for fixing the globe 30 for infrared light formation to the reflector 16, and the inside of the globe 30C can be prevented from being filled with heat still more by the radiating function of the radiation fin 62 in addition to the radiating function of an air convection generated across the inside and outside of the globe 30C.

More specifically, the second holder 60 is formed to have the shape of a stepped cylinder to be engaged with a bulb insertion attachment hole 13, and a pair of legs 55A extended toward the inside of the rear end of the holder 50B are fixed to a flange portion 63 formed on the front end of the second holder 60. The disc-shaped radiation fin 62 is formed in the second holder 60, and heat transferred to the globe 30C by turning on a bulb 20 is radiated from the radiation fin 62 to a space on the back of the reflector 16 through the holder 50B and the second holder 60. Consequently, it is possible to avoid various problems of an increase in the temperature of the bulb 20.

The order of assembly of the bulb 20, the holder 50B (the second holder 60) and the bulb insertion attachment hole 13 is optional. The bulb 20 may be fixed to the holder 50B (the second holder 60) and may be then assembled into the bulb insertion attachment hole 13, or the holder 50B (the second holder 60) may be assembled into the bulb insertion attachment hole 13 and the bulb 20 may be then fixed to the holder 50B (the second holder 60).

Others are the same as those of the infrared irradiation lamp 10E according to the fifth embodiment (see FIGS. 12 and 13(a) to (c)) and have the same reference numerals, and repetitive description thereof will be thereby omitted.

Figure 15:
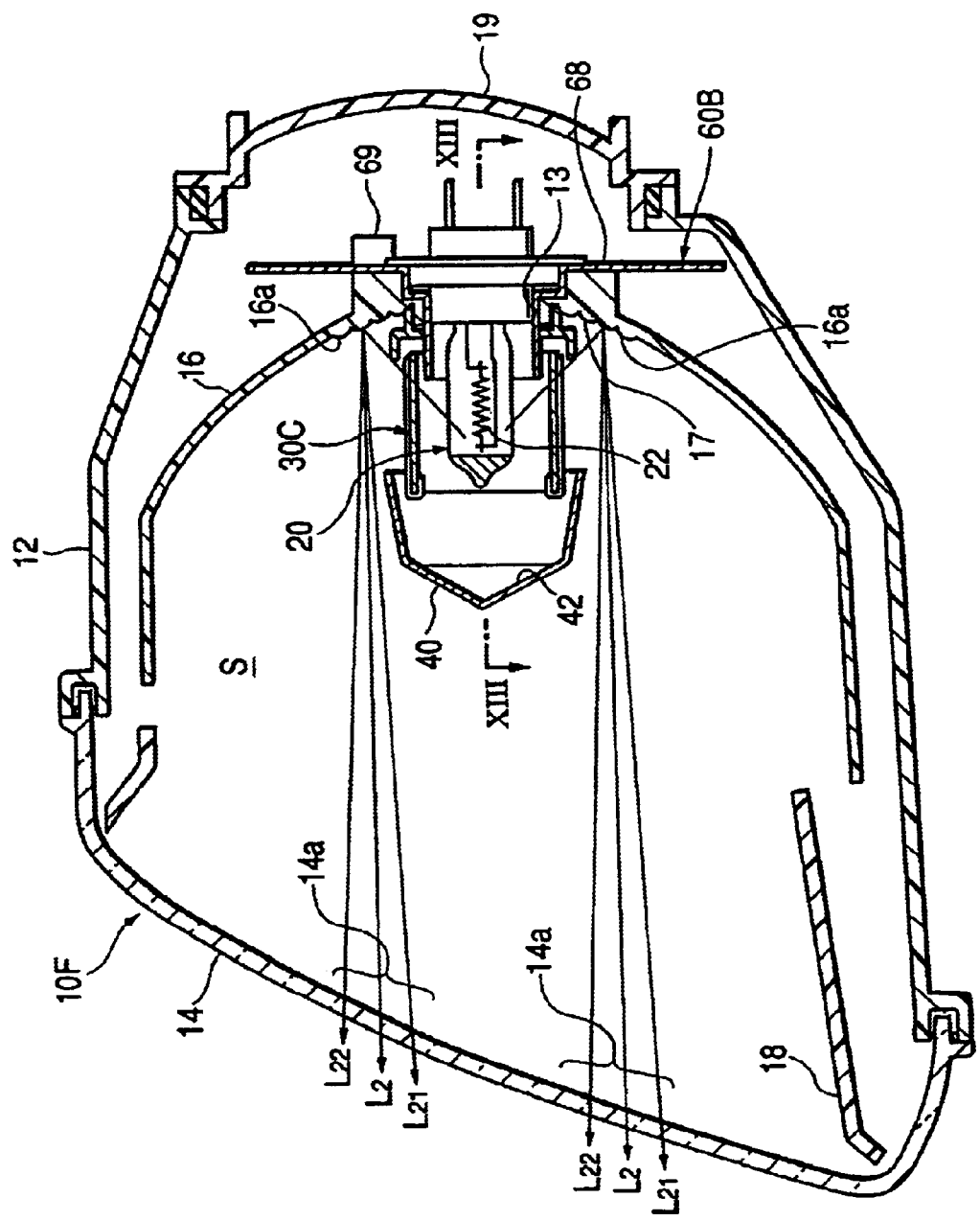
FIG. 15 is a longitudinal sectional view showing an infrared irradiation lamp according to a ninth embodiment of the invention.
Figure 16:
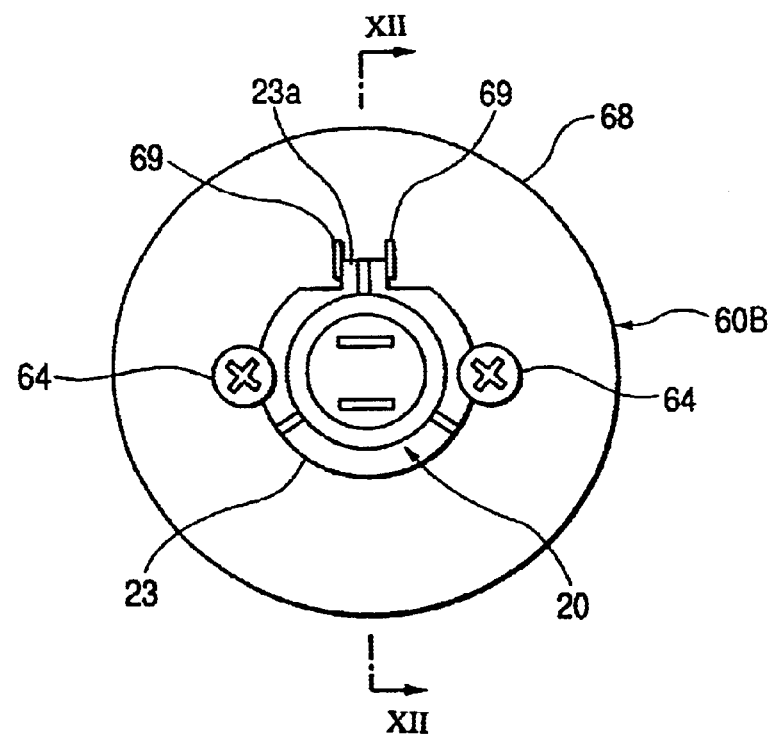
FIG. 16 is a rear view showing the periphery of a bulb insertion attachment hole of a reflector into which a bulb is inserted and attached.
Figure 17:
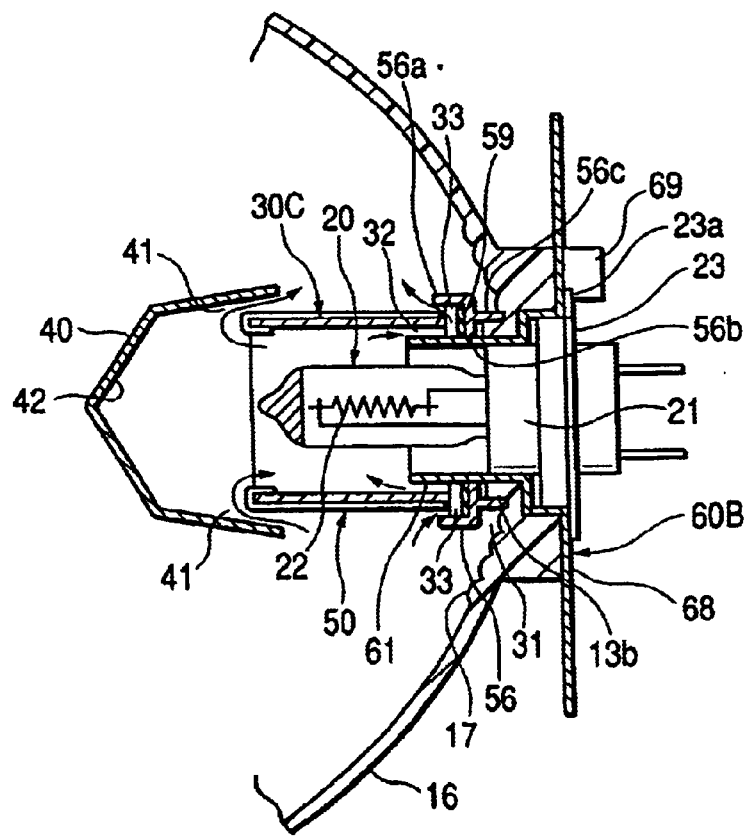
FIG. 17 is an enlarged longitudinal sectional view showing the periphery of the bulb insertion attachment hole (a sectional view taken along a line XII—XII illustrated in FIG. 15)
Figure 18:
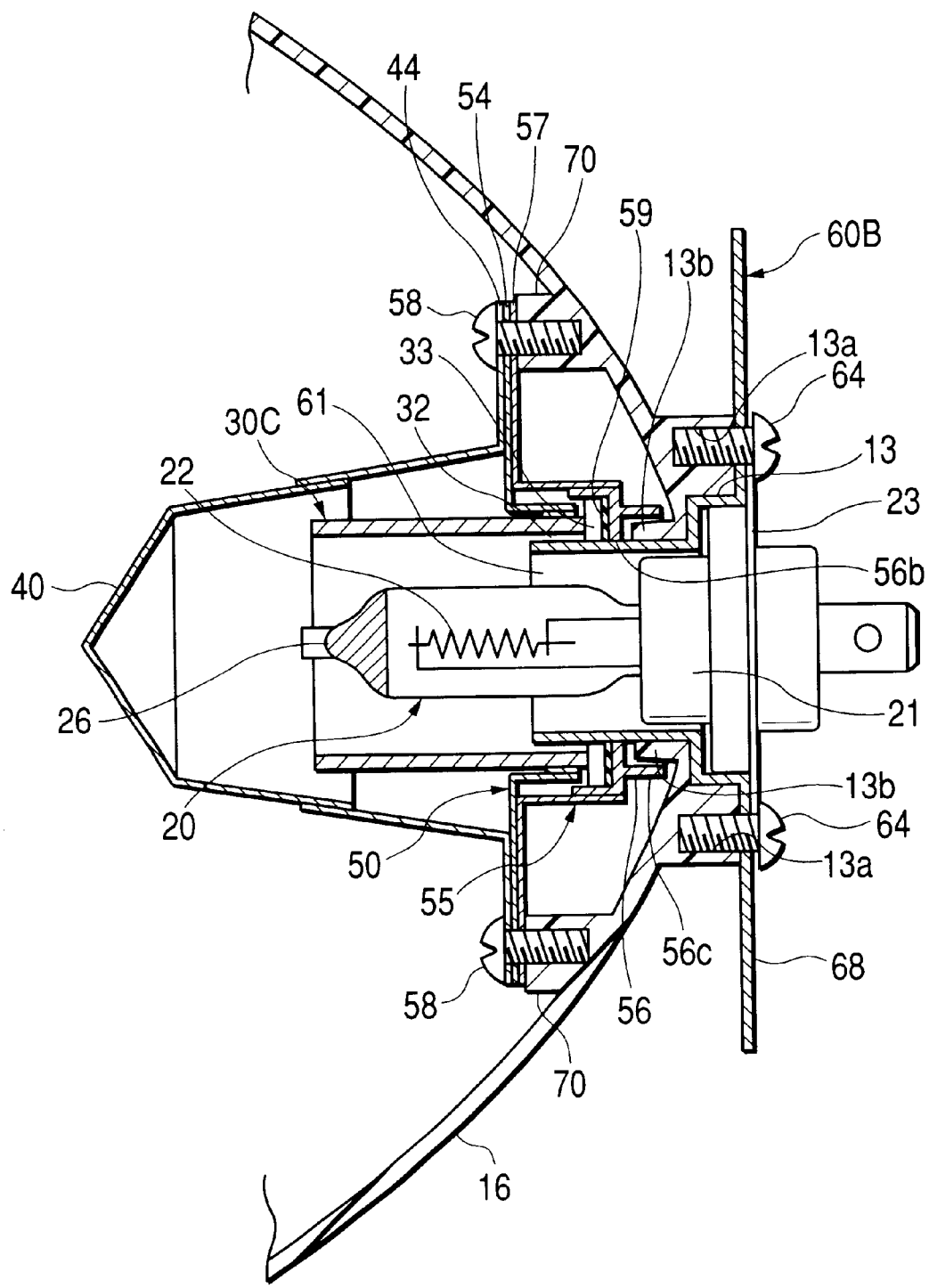
FIG. 18 is an enlarged horizontal sectional view showing the periphery of the bulb insertion attachment hole (a sectional view taken along a line XIII—XIII illustrated in FIG. 14)
Figure 19:
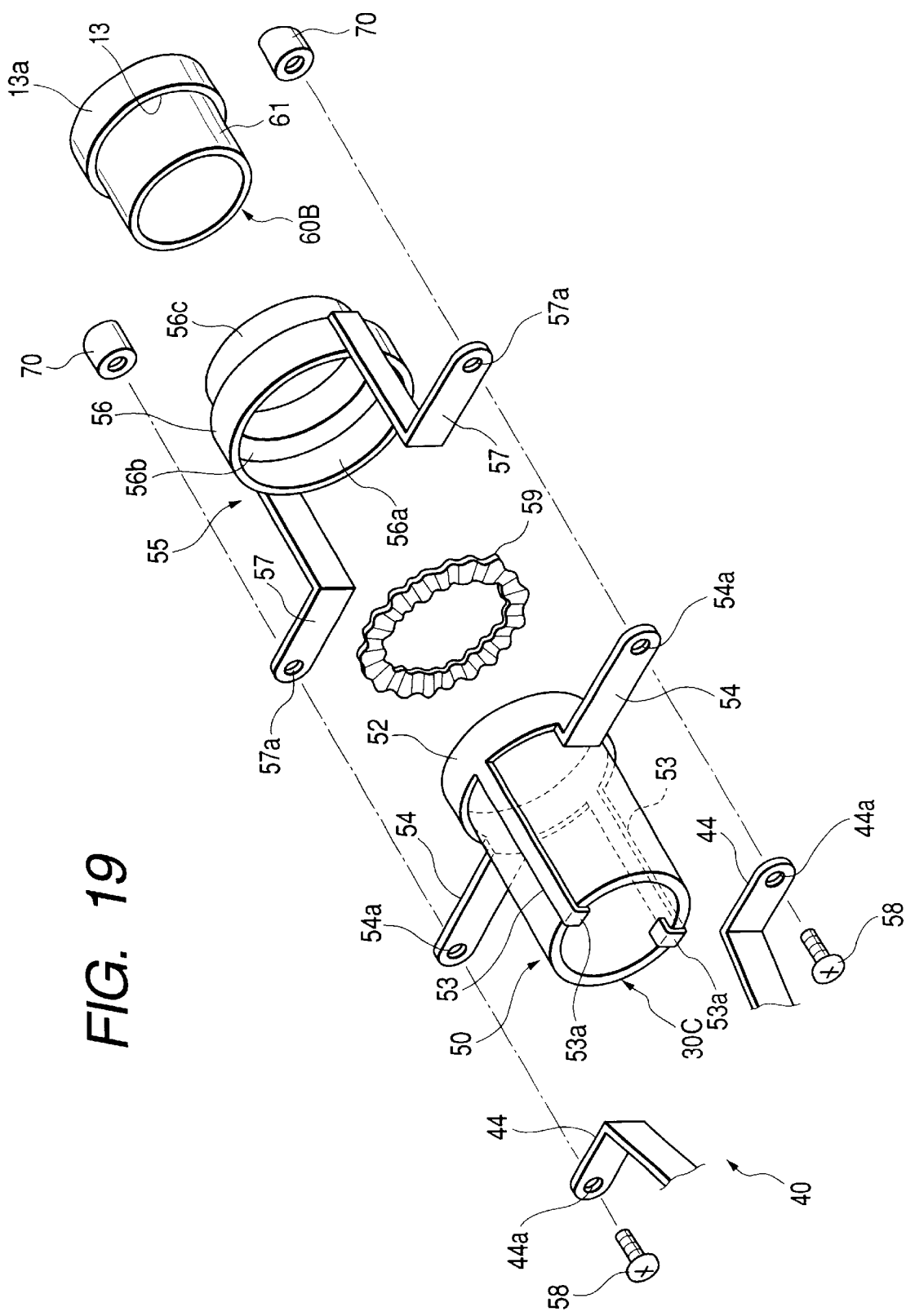
FIG. 19 is an exploded perspective view showing a shielding shade and a globe holder.

FIGS. 15 to 19 show an infrared irradiation lamp according to a tenth embodiment of the invention, and FIG. 15 is a longitudinal sectional view showing an infrared irradiation lamp, FIG. 16 is a rear view showing the periphery of a bulb insertion attachment hole of a reflector into which a bulb is inserted and attached, FIG. 17 is an enlarged longitudinal sectional view showing the periphery of the bulb insertion attachment hole (a sectional view taken along a line XII—XII illustrated in FIG. 16), FIG. 18 is an enlarged horizontal sectional view showing the periphery of the bulb insertion attachment hole (a sectional view taken along a line XIII—XIII illustrated in FIG. 15), and FIG. 19 is an exploded perspective view showing a shielding shade and a globe holder.

While all of the infrared irradiation lamps 10A to 10E according to the first to fifth embodiments have the reflectors 16 formed integrally with the inner peripheral surface of the lamp body 12, an infrared irradiation lamp 10F according to this embodiment has the reflector 16 supported tiltably with respect to the lamp body 12 by means of an aiming mechanism (not shown). Moreover, the reflector 16 is constituted by aluminum die casting in order to enhance a heat radiating property.

The reference numeral 60B denotes a bulb holder which is inserted and attached into a bulb insertion attachment hole 13 and is formed by the aluminum die casting and which is constituted by a cylindrical portion 61 having such a shape as to almost come in close contact with the bulb insertion attachment hole 13 and a mouth piece 21 of a bulb 20, and a radiation fin 68 extended to be disc-shaped orthogonally to the rear end of the cylindrical portion 61. The front end of the cylindrical portion 61 is extended forward from the reflector 16 up to the vicinal position of a filament 22 to be the light emitting portion of the bulb 20.

The reference numeral 64 denotes a bulb holder fixing screw capable of fixing a bulb holder 60B to the reflector 16 by screwing into a pair of boss holes 13a and 13a provided with the bulb insertion attachment hole 13 interposed therebetween. Moreover, the head portion of the screw 64 also functions to press and fix the peripheral edge portion of a flange 23 of the bulb 20 inserted and attached into the bulb insertion attachment hole 13 (the cylindrical portion 61 of the bulb holder 60B). The reference numerals 69 and 69 shown in FIG. 16 denote a pair of erected walls provided on the radiation film 68 which can position the bulb 20 in a circumferential direction by engaging a rectangular plate-shaped engagement projection 23a on the flange 23 side of the bulb 20 between the erected walls 69 and 69.

Moreover, a globe 30C for infrared light formation which covers the halogen bulb 20 is held in a metallic globe holder 50 fixed to the reflector 16. The globe holder 50 includes an annular portion 52 for holding the outer periphery of the rear end of the globe 30C and a pair of straight portions 53 and 53 extended forward from the annular portion 52 and has such a structure that front ends 53a and 53a of the straight portions 53 and 53 are caulked to be folded back toward the inside of an opening on the front end of the globe 30C so that the globe holder 50 is integrated with the globe 30C, and a pair of left and right legs 54 and 54 are provided in the annular portion 52.

The reference numeral 55 denotes a second bulb holder for backing up the globe holder 50 from the back side and for transferring heat on the globe holder 50 side toward the bulb holder 60B side in contact with the cylindrical portion 61 of the bulb holder 60B. More specifically, a second globe holder 55 has an annular portion 56 capable of being engaged with the outer periphery of a cylindrical portion 13b extended forward from the peripheral edge of the bulb insertion attachment hole 13 and abutting on the outer peripheral surface of the cylindrical portion 61 of the bulb holder 60B, and the annular portion 56 has such a structure that an erected wall-shaped rear cylindrical portion 56c having a small diameter is formed on the back side of an inner flange portion 56b formed in an erected wall-shaped front cylindrical portion 56a having a large diameter, and a pair of L-shaped legs 57 and 57 extended forward and then in a transverse direction are provided on the left and right of the annular portion 56. The second globe holder 55, the globe holder 50 and a shielding shade 40 are fastened together to a pair of bosses 70 protruded toward the front face of the reflector 16 with a screw 58 by sequentially superposing respective legs 57, 54 and 44, and are thereby fixed integrally with the reflector 16. The reference numerals 57a, 54a and 44a are screw insertion holes.

The leg 54 of the globe holder 50 is integrated in such a configuration as to be longitudinally laminated in close contact with the leg 57 of the second globe holder 55 and the leg 42 of the shielding shade 40, and more specifically, the globe holder 50 is backed up from both the front face side and the back face side so that a strength is increased. In the second globe holder 55 for backing up the back face side of the globe holder 50, moreover, the central annular portion 56 abuts on the outer peripheral surface of the cylindrical portion 61 of the bulb holder 60B and is thereby positioned in vertical and transverse directions, and furthermore, is engaged with the cylindrical portion 13b provided on the reflector 16 side and is thereby positioned in a longitudinal direction. The rear end of the globe 30C held in the globe holder 50 abuts on a wave-shaped washer 59 accommodated in the annular portion 56 of the second globe holder 55 so that the globe 30C is energized and held forward and is thereby positioned in the longitudinal direction.

Moreover, the wave-shaped washer 59 provided between the flange portion 56b of the annular portion 56 and the rear end of the globe 30C absorbs a vibration transmitted to the globe 30C and holds the globe 30C so as not to be vibrated with respect to the reflector 16 and the bulb 20, and furthermore, absorbs a difference in a thermal expansion generated between the globe 30C formed of glass and the metallic globe holders 50 and 55 such that a thermal stress is not caused by the difference in a thermal expansion between the members 30C, 50 and 55.

More specifically, when both longitudinal ends of the globe 30C are fixed to the globe holder 50 by caulking, a thermal stress is caused by the difference in a thermal expansion due to an increase in a temperature generated by turn-on between the globe 30C formed of glass and the metallic globe holder 50. When such a state is repeated, the metallic globe holder 50 is fatigued so that the fixing portion of the globe 30C is loosened. However, while the front end side of the globe 30C is fixed to the globe holder 50 by caulking in the embodiment, the rear end side is simply held in the annular portion 52 and the globe 30C and the annular portion 52 can be relatively moved in an axial direction based on the difference in a thermal expansion between metal and glass so that a thermal stress is not generated between the globe 30C and the globe holder 50.

The rear end of the globe 30C which can be moved rearward in the axial direction is energized and held forward by the wave-shaped washer 59 accommodated in the annular portion 56 of the second globe holder 55 so that the globe 30C is positioned in the longitudinal direction.

Moreover, a clearance 31 (see FIG. 17) is provided between the rear end of the globe 30C and the reflector 16. The clearance 31 does not serve to guide a light of a light source (a white light) for diluting a red light component L2 to a peripheral region 16a of the light source in the reflector 16 differently from the third embodiment (see FIG. 10) but mainly contributes to the generation of an air convection across the inside and outside of the globe 30C.

More specifically, the cylindrical portion 61 of the bulb holder 60B and the annular portion 56 of the second globe holder 55 are provided in the clearance 31 formed between the rear end of the globe 30C and the reflector 16, and are exactly positioned on an optical path of a direct light of the bulb 20 which is transmitted through an opening on the rear end of the globe 30C toward the peripheral region 16a of the light source in the reflector 16 so that the direct light (white light) of the bulb 20 transmitted toward the peripheral region 16a of the light source in the reflector 16 is shielded by the cylindrical portion 61 and the annular portion 56 and is not guided to the peripheral region 16a of the light source in the reflector 16. In the embodiment, therefore, there is no such a function that the red light component L2 guided to the peripheral region 16a of the light source in the reflector 16 is not diluted with a white light component L3 differently from the third embodiment (see FIG. 10). However, a part of the red light component L2 transmitted toward the peripheral region 16a of the light source in the reflector 16 is shielded by the cylindrical portion 16 and the annular portion 56. Therefore, the total amount of the red light component L2 reflected and diffused by the peripheral region 16a of the light source in the reflector 16 is decreased so that the luminous flux density of the red light component distributed forward from a front lens 14 is correspondingly reduced and the lamp is not seen to emit a red light.

A clearance 32 (see FIG. 17) is formed between the rear end side of the globe 30C and the cylindrical portion 61 of the bulb holder 60B, and a clearance 33 (see FIG. 17) communicating with the clearance 32 and the outside of the globe 30C is formed between the rear end of the globe 30C and the annular portion 56 of the second globe holder 55. While the wave-shaped washer 59 is accommodated in the annular portion 56, the communication configuration of the clearance 33 is not blocked by the washer 59. Furthermore, a clearance 41 is also formed between a shielding shade 40 and the front end of the globe 30C. For this reason, the inside of the globe 30C communicates with the outside of the globe 30C through the clearance 41 formed on the frond end side and the clearances 32 and 33 formed on the rear end side, and an air convection (see an arrow in FIG. 17) is generated across the inside and outside of the globe 30C and the heat of the globe 30C is radiated out of the globe 30C so that the inside of the globe 30C is not filled with the heat.

Moreover, the heat transferred to the shielding shade 40, the globe holder 50 and the second globe holder 55 provided to cover the bulb 20 is transferred to the bulb holder 60B through (the inner flange portion 56b of) the annular portion 56 of the second globe holder 55 and is radiated from a radiation fin 68 to a space provided on the back of the reflector 16. Therefore, the inside of the globe 30C is not filled with the heat.

While the shielding shade 40, the globe holder 50 and the second globe holder 55 are fastened together with their respective legs superposed as described above in order to fix them to the reflector 16, the fixation of the members 40, 50 and 55 and the insertion and attachment of the bulb holder 60B and the bulb 20 may be carried out in any order.

The reference numeral 18 denotes an extension reflector and the reference numeral 19 denotes a cover attached to an opening for bulb exchange in the rear top portion of a lamp body 12. Others are the same as those in the first and third embodiments (see FIGS. 8, 9 and 10) and have the same reference numerals, and repetitive description thereof will be thereby omitted.

While the reflector 16 is formed of metal (aluminum) in order to enhance a heat radiating property in the globe 30C for infrared light formation in the sixth embodiment, it may be formed of a resin which has a slightly poorer heat radiating property.

Figure 20:
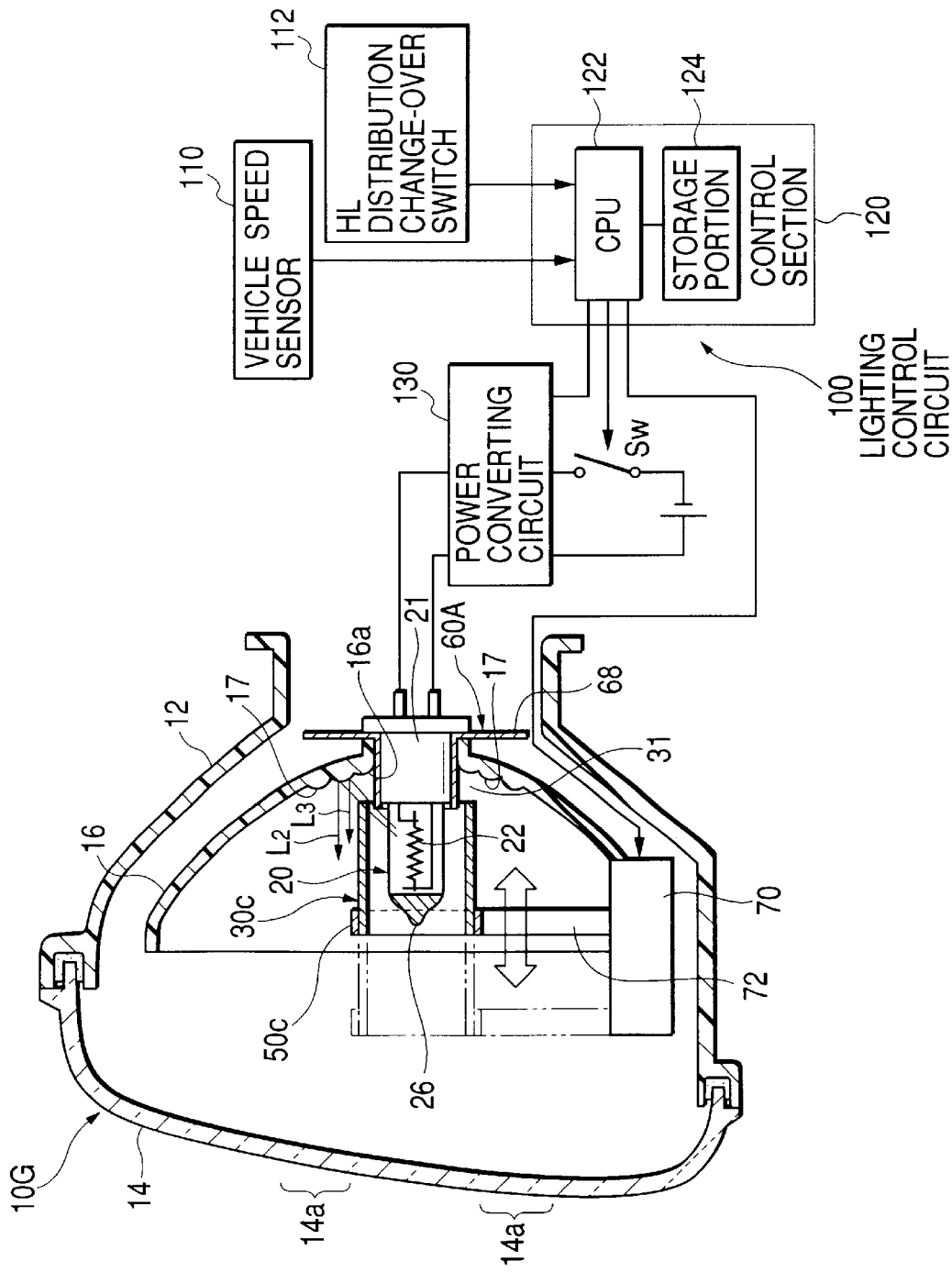
FIG. 20 is a longitudinal sectional view showing an infrared irradiation lamp according to a tenth embodiment of the invention.

FIG. 20 is a longitudinal sectional view showing an infrared irradiation lamp according to a tenth embodiment of the invention.

An infrared irradiation lamp 10G according to the embodiment features that a globe 30C for infrared light formation is fixed to a slider 72 of a longitudinally slidable actuator 70 through an annular globe holder 50C and also functions as a lamp for main (beam formation) of a headlamp. The actuator 70 is fixed integrally with the lower end of a reflector 16. The basic structure of the infrared irradiation lamp 10G is the same as the structures in the first embodiment (see FIGS. 4, 5(a), 5(b) and 6) and the sixth embodiment (see FIG. 15), and the same portions have the same reference numerals and repetitive description thereof will be thereby omitted.

More specifically, if the globe 30C for infrared light formation which covers a bulb 20 is placed in a position shown in a solid line of FIG. 20, a light (white light) emitted from the bulb 20 is transmitted through the globe 30C and is changed into an infrared light, and the infrared light is reflected by the reflector 16 and is emitted from a front lens 14 so that the globe 30C functions as an infrared irradiation lamp. The red light component of a visible light which cannot be completely cut by the globe 30C is diffused and reflected by a peripheral region 16a of a light source in the reflector 16 (a fish-eye step 17) and is thus emitted from the front lens 14. Furthermore, the light of the light source is guided from a clearance 31 provided between the globe 30C and the reflector 16 to the peripheral region 16a of the light source in the reflector 16, and the light of the light source (white light) is diffused and reflected by the fish-eye step 17 and is thus emitted from the front lens 14. Accordingly, the luminous flux density of the red light component distributed forward from a region 14a of the central part of the front lens 14 is reduced so that the lamp is not seen to emit a red light.

Furthermore, a light shielding portion 26 referred to as a black top is provided in the tip portion of the glass bulb of the bulb 20 and serves to shield a direct light (a visible light and an infrared light) transmitted forward from the bulb 20, thereby impeding the generation of a glare light.

Moreover, a bulb holder 60 having a radiation fin 68 is provided between a bulb insertion attachment hole 13 and a mouth piece 21 of the bulb 20, and heat generated by the light emission of the bulb 20 (filament 22) is transferred from a cylindrical portion 61 on the front end side of a bulb holder 60A to the radiation fin 68 and is radiated to a space provided on the back of the reflector 16. During the turn-on of the infrared irradiation lamp having such a configuration that the bulb 20 is covered with the globe 30C for infrared light formation, therefore, the inside of the globe 30C is not filled with the heat so that the bulb 20 and the globe 30C for infrared light formation are not influenced adversely.

On the other hand, when the globe 30C for infrared light formation is moved to a position shown in a virtual line of FIG. 20 to release the periphery of the bulb 20 by the actuator 70, a light (white light) emitted from the bulb 20 is not transmitted through the globe 30C but is guided to the whole reflector 16 so that a main beam is formed.

Moreover, in the case in which the lamp 10G is to be used as an infrared irradiation lamp by a lighting control circuit 100 comprising a vehicle speed sensor 110, a headlamp light distribution change-over switch 112 and a control portion 120 having a CPU 122 and a storage portion 124, the lamp 10G is turned on during only a running operation and is automatically put out at a predetermined speed V0 or less at which a vehicle speed V approximates to zero at time of stoppage. Furthermore, in the case in which the light distributed from a headlamp is to be changed into a main beam, the globe 30C is moved forward so that only a visible light is distributed.

More specifically, a vehicle speed condition for outputting a stop signal to stop the light emission of the bulb 20 is previously input and set to the storage portion 124 of the control portion 120. When the CPU 122 decides that the vehicle speed V is set to be the predetermined speed V0 or less which approximates to zero in response to an output sent from the vehicle speed sensor 110, it outputs a stop signal for turning OFF a bulb turn-on switch Sw. Consequently, the bulb turn-on switch Sw is turned OFF so that the supply of a current to the bulb 20 is stopped and the bulb 20 (lamp 10G) is thereby put out.

Moreover, the reference numeral 130 denotes a power converting circuit constituted by a chopper circuit provided in a feeding path to the bulb 20 which is not operated but exactly supplies the power of a battery to the bulb when it is used as the lamp for main beam formation, and is operated (causes the supplied power to take the shape of a rectangular wave) to convert the power to a predetermined proper power (for example, 12V) to be supplied to the bulb 20 when it is used as the infrared irradiation lamp and the power supplied from the battery exceeds a predetermined value (for example, 13V). Consequently, it is possible to avoid various problems caused by the inside of the globe 30C filled with heat to increase the temperature of the bulb 20.

Figure 21:
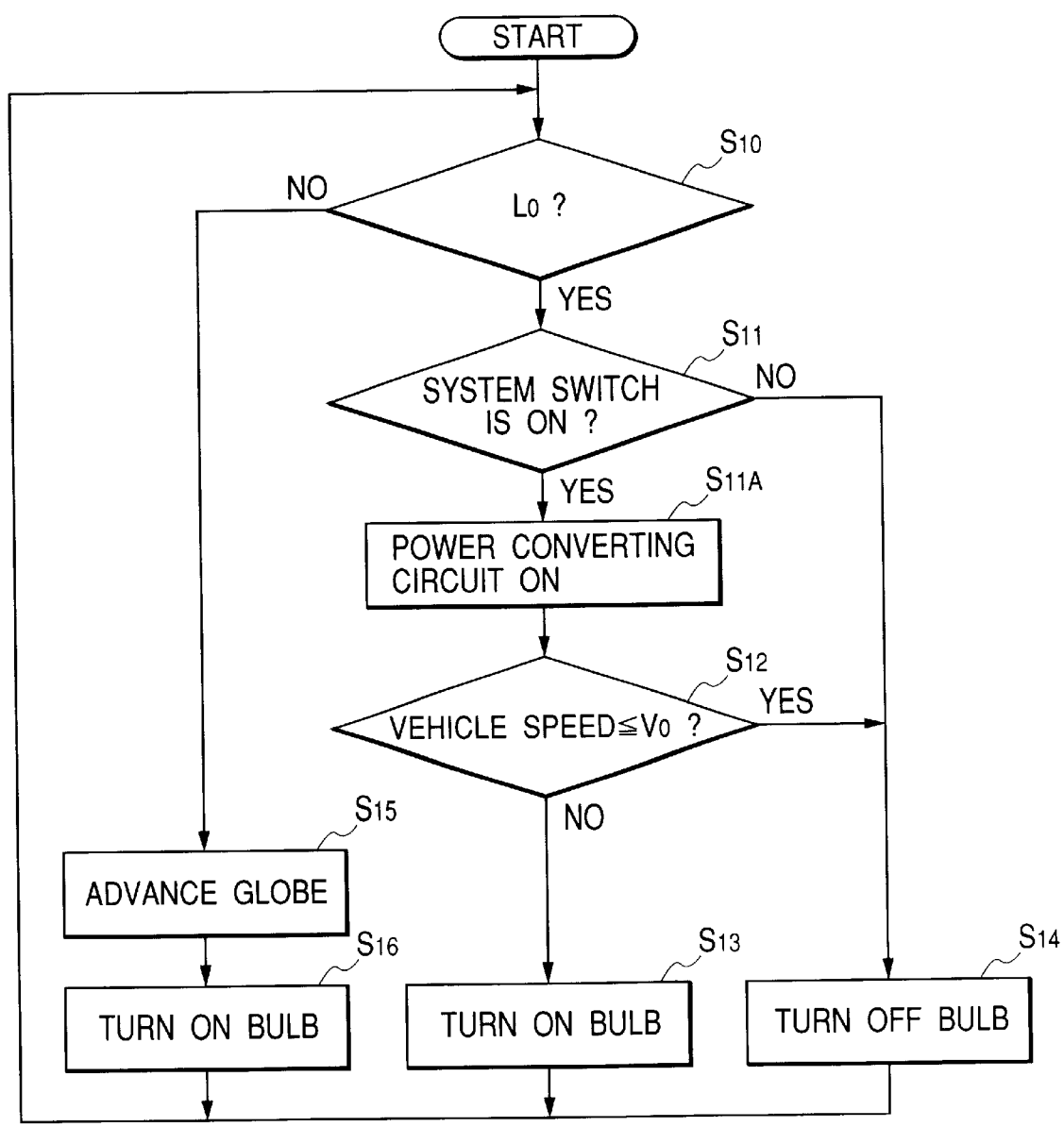
FIG. 21 is a flow chart showing a processing flow of a CPU in a control portion for controlling the turn-on of the infrared irradiation lamp.

FIG. 21 shows a processing flow of the control portion 120 (CPU 122) of the lighting control circuit 100. This routine is started on the premise that a headlamp (a low beam or a main beam) is set in a turn-on state.

First of all, at a step S10, it is decided whether or not the turn-on of the headlamp is the low beam based on a signal sent from the light distribution change-over switch 112. If the decision is YES (low beam turn-on) at the step S10, the process proceeds to a step S11 in which it is decided whether or not a switch for operating a main beam night forward field-of-view detecting system is ON. Although the system operating switch is pressed as a manual switch when a driver drives while watching an image on a head up display 6, it may be constituted to be turned ON interlockingly with the turn-on of the low beam.

Then, if the decision is YES at the step S11 (the night forward field-of-view detecting system operating switch is ON), a signal for setting the power converting circuit 130 into an operation state is output at a step S11A. At a step S12, then, it is decided whether or not a vehicle speed V is equal to or lower than a predetermined value (V0) which approximates to zero based on the output of the vehicle speed sensor 110. If the decision is NO (V>V0) at the step S12, the process proceeds to a step S13 in which an output is sent to turn ON the bulb 20, and then returns to the step S10.

On the other hand, if the decision is NO (main beam turn-on) at the step S10, the process proceeds to a step S15 in which an actuator driving signal is output to move the globe 30 forward. At a step S16, an output is sent to turn on the bulb 20. Consequently, a main beam is obtained by only a visible light.

Moreover, if the decision is NO at the step S11 (the night forward field-of-view detecting system operating switch is not ON) or the decision is YES at the step S12 (V≦V0), an output is sent to put out the lighted bulb 20 (the infrared irradiation lamp 10) at a step S14 and the process then returns to the step S10.

While the fish-eye steps 17 and 15 are illustrated as diffusion steps for diffusing a red light component which are to be provided in the reflector 16 and the front lens 14 in the embodiment, it is also possible to provide a cylindrical step having the function of diffusing and reflecting a light or diffusing and transmitting the light or another step.

Moreover, while the diffusion step represented by the fish-eye step 17 for diffusing the infrared light component is provided in the peripheral region 16a of the light source in the reflector 16 and the region 14a of the central part of the front lens in the embodiments, the diffusion step is not always required.

As is apparent from the description, according to the first aspect of the invention, the luminous flux density of a red light component emitted from the vicinity of the central part of the front lens is low. Therefore, even if the infrared irradiation lamp is turned on, a red color is not remarkable and the lamp is not seen to be red differently from the conventional art. Therefore, there is no possibility that a driver and a pedestrian might erroneously recognize the turn-on of the infrared irradiation lamp as the turn-on of a tail lamp or a stop lamp. Correspondingly, safety for running can be maintained.

Moreover, the inside of the globe for infrared light formation is not filled with heat. Therefore, an increase in the temperatures of the light source and the globe for infrared light formation can be prevented. First of all, consequently, the lifetime of the light source can be prolonged. Secondly, a thermal degradation in the infrared light transmission multilayer film provided in the globe can be suppressed. Thus, it is possible to provide an infrared irradiation lamp in which the infrared light transmittance of the globe can be guaranteed to be constant for a long period of time and the amount of irradiation can be stabilized for a long period of time.

According to the second aspect of the invention, a glare light is not generated during the turn-on of the lamp. Therefore, a car running in the opposite direction or a pedestrian is not bothered.

Moreover, the inside of the globe for infrared light formation can be prevented from being filled with the heat still more. Therefore, an increase in the temperatures of the light source and the globe for infrared light formation can be prevented. First of all, consequently, the lifetime of the light source can further be prolonged. Secondly, a thermal degradation in the infrared light transmission multilayer film provided in the globe can be suppressed reliably. Thus, it is possible to provide an infrared irradiation lamp in which the infrared light transmittance of the globe can be guaranteed to be constant for a longer period of time and the amount of irradiation can be stabilized for a long period of time.

According to the third aspect of the invention, the luminous flux density of a red light component emitted from the vicinity of the central part of the front lens is more reduced. Therefore, even if the infrared irradiation lamp is turned on, a red color is not remarkable and there is no possibility that a driver and a pedestrian might erroneously recognize the turn-on of the infrared irradiation lamp as the turn-on of a tail lamp or a stop lamp. Correspondingly, safety for running can be maintained still more.

Moreover, since the globe for infrared light formation is firmly fixed and held without a looseness with respect to the reflector, a high durability can also be obtained.

As is apparent from the description, according to the fourth aspect of the invention, the heat in the globe for infrared light formation is radiated to the space provided on the back of the reflector by the bulb holding member. Therefore, the inside of the globe for infrared light formation is not filled with the heat so that the temperatures of the bulb and the globe for infrared light formation can be prevented from being increased. First of all, consequently, the lifetime of the bulb can be prolonged. Secondly, a thermal degradation in an infrared light transmission multilayer film provided in the globe can be suppressed. Therefore, it is possible to provide an infrared irradiation lamp in which the infrared light transmittance of the globe can be guaranteed to be constant for a long period of time and the amount of irradiation can be stabilized for a long period of time.

According to the fifth aspect of the invention, the inside of the globe for infrared light formation can further be prevented from being filled with the heat and an increase in the temperatures of the bulb and the globe for infrared light formation can be avoided reliably so that the lifetime of the bulb can further be prolonged. In addition, a thermal degradation in the infrared light transmission multilayer film provided in the globe can be suppressed still more. Therefore, it is possible to provide an infrared irradiation lamp in which the infrared light transmittance of the globe can be guaranteed to be constant for a longer period of time and the amount of irradiation can be stabilized for a long period of time.

According to the sixth aspect of the invention, by the heat radiating function of an air convection generated across the inside and outside of the globe for infrared light formation, the inside of the globe can further be prevented from being filled with the heat and an increase in the temperatures of the light source and the globe for infrared light formation can be avoided still more so that the lifetime of the light source can be prolonged still more. In addition, a thermal degradation in the infrared light transmission multilayer film provided in the globe can be suppressed reliably. Therefore, it is possible to provide an infrared irradiation lamp in which the infrared light transmittance of the globe can be guaranteed to be constant for a longer period of time and the amount of irradiation can be stabilized for a long period of time.

According to the seventh aspect of the invention, a glare light is not generated during the turn-on of the lamp. Therefore, a car running in the opposite direction or a pedestrian is not bothered.

By the heat radiating function of an air convection generated across the inside and outside of the globe for infrared light formation, the inside of the globe can be prevented still more from being filled with the heat and an increase in the temperatures of the light source and the globe for infrared light formation can be avoided still more so that the lifetime of the light source can be prolonged still more. In addition, a thermal degradation in the infrared light transmission multilayer film provided in the globe can be suppressed reliably. Therefore, it is possible to provide an infrared irradiation lamp in which the infrared light transmittance of the globe can be guaranteed to be constant for a longer period of time and the amount of irradiation can be stabilized for a long period of time.

According to the eighth aspect of the invention, the heat transferred to the globe for infrared light formation is also radiated to the space provided on the back of the reflector through the globe holder and the bulb holding member. Therefore, the inside of the globe can be prevented still more from being filled with the heat and an increase in the temperatures of the light source and the globe for infrared light formation can be avoided still more so that the lifetime of the light source can be prolonged still more. In addition, a thermal degradation in the infrared light transmission multilayer film provided in the globe can be suppressed reliably. Therefore, it is possible to provide an infrared irradiation lamp in which the infrared light transmittance of the globe can be guaranteed to be constant for a longer period of time and the amount of irradiation can be stabilized for a long period of time.

What is claimed is:

1. An infrared irradiation lamp for an automobile comprising a lamp housing formed by a lamp body and a front lens, a reflector provided in the lamp body, a light source provided ahead of the reflector in the lamp housing, and a cylindrical globe for infrared light formation which is provided to cover the light source and serves to shield a visible light and to transmit only an infrared light, wherein the globe for infrared light formation has a rear end thereof provided apart from the reflector, and a light of the light source is directly guided from a clearance provided between the reflector and the rear end of the globe for infrared light formation to a peripheral region of the light source in the reflector.

2. The infrared irradiation lamp for an automobile according to claim 1, wherein a shielding shade for shielding the light of the light source emitted from an opening on a front end side of the globe is provided ahead of the globe for infrared light formation, and a clearance is provided between the shielding shade and the globe for infrared light formation.

3. The infrared irradiation lamp for an automobile according to claim 1, wherein an outer periphery of the rear end of the globe for infrared light formation is provided with an annular light shielding portion to be a part of a metallic holder for fixing and holding the globe for infrared light formation into the reflector or the shielding shade.

4. The infrared irradiation lamp for an automobile according to claim 2, wherein an outer periphery of the rear end of the globe for infrared light formation is provided with an annular light shielding portion to be a part of a metallic holder for fixing and holding the globe for infrared light formation into the reflector or the shielding shade.

5. An infrared irradiation lamp for an automobile comprising a lamp housing formed by a lamp body and a front lens, a reflector provided in the lamp body, a bulb to be a light source inserted and attached into a bulb insertion attachment hole of the reflector and provided ahead of the reflector, and a cylindrical globe for infrared light formation which is provided to cover the bulb and serves to shield a visible light and to transmit only an infrared light, wherein a metallic bulb holding member having a radiation fin extended to a back of the reflector is provided between the bulb insertion attachment hole and a mouth piece of the bulb.

6. The infrared irradiation lamp for an automobile according to claim 5, wherein a front end of the bulb holding member is extended to such a position as to face the vicinity of a light emitting portion of the bulb.

7. The infrared irradiation lamp for an automobile according to claim 5, wherein the globe for infrared light formation has a rear end thereof provided apart from the reflector.

8. The infrared irradiation lamp for an automobile according to claim 6, wherein the globe for infrared light formation has a rear end thereof provided apart from the reflector.

9. The infrared irradiation lamp for an automobile according to claim 5, wherein a metallic shielding shade for shielding a direct light of a bulb which is emitted from an opening on a front end side of the globe is provided ahead of the globe for infrared light formation, and a clearance is provided between the shielding shade and the globe for infrared light formation.

10. The infrared irradiation lamp for an automobile according to claim 6, wherein a metallic shielding shade for shielding a direct light of a bulb which is emitted from an opening on a front end side of the globe is provided ahead of the globe for infrared light formation, and a clearance is provided between the shielding shade and the globe for infrared light formation.

11. The infrared irradiation lamp for an automobile according to claim 7, wherein a metallic shielding shade for shielding a direct light of a bulb which is emitted from an opening on a front end side of the globe is provided ahead of the globe for infrared light formation, and a clearance is provided between the shielding shade and the globe for infrared light formation.

12. The infrared irradiation lamp for an automobile according to 5, wherein the globe for infrared light formation is fixed to the reflector through a metallic globe holder provided in contact with an extended portion on a front end side of the bulb holding member.

13. The infrared irradiation lamp for an automobile according to 6, wherein the globe for infrared light formation is fixed to the reflector through a metallic globe holder provided in contact with an extended portion on a front end side of the bulb holding member.

14. The infrared irradiation lamp for an automobile according to 7, wherein the globe for infrared light formation is fixed to the reflector through a metallic globe holder provided in contact with an extended portion on a front end side of the bulb holding member.

15. The infrared irradiation lamp for an automobile according to 8, wherein the globe for infrared light formation is fixed to the reflector through a metallic globe holder provided in contact with an extended portion on a front end side of the bulb holding member.

* * * * *